USO11252557B2

United States Patent
Liu et al.

(10) Patent No.: US 11,252,557 B2
(45) Date of Patent: Feb. 15, 2022

(54) CAPABILITY IDENTIFIER DISTRIBUTION METHOD AND DEVICE

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/313,889

(22) Filed: May 6, 2021

(65) Prior Publication Data

US 2021/0258768 A1 Aug. 19, 2021

Related U.S. Application Data

(63) Continuation of application No. PCT/CN2019/080246, filed on Mar. 28, 2019.

(51) Int. Cl.
*H04W 8/24* (2009.01)
*H04W 60/00* (2009.01)

(52) U.S. Cl.
CPC ............. *H04W 8/24* (2013.01); *H04W 60/00* (2013.01)

(58) Field of Classification Search
CPC .................................. H04W 8/24; H04W 60/00
USPC ........................................................ 455/435.1
See application file for complete search history.

(56) References Cited

U.S. PATENT DOCUMENTS

| 9,137,844 B2* | 9/2015 | Kitazoe .................. H04W 76/27 |
| 10,785,632 B2* | 9/2020 | Kawasaki ............. H04W 60/04 |
| 2019/0074887 A1 | 3/2019 | Yiu et al. |
| 2021/0014688 A1* | 1/2021 | Ito ....................... H04W 12/041 |

FOREIGN PATENT DOCUMENTS

| CN | 102378249 A | 3/2012 |
| WO | 2019031540 A1 | 2/2019 |

OTHER PUBLICATIONS

3GPP TR 23.743 V16.0.0 Mar. 2019.*
3GPP TSG RAN2 Meeting #104 R2-1816462 Nov. 2018.*
3GPP TSG RAN Meeting #83 RP-190122 Mar. 2019.*
3GPP SA WG2 Mtg #131 S2-1901713 Feb. 2019.*
3GPP TR 23.743 V1.2.0 (Mar. 2019)—3rd Generation Partnership Project; Technical Specification Group Services and System Aspects; Study on optimisations of UE radio capability signalling (Release 16) (57 pages).

(Continued)

*Primary Examiner* — William Nealon
(74) *Attorney, Agent, or Firm* — Perkins Coie LLP

(57) ABSTRACT

Disclosed in the present application is a capability identifier distribution method, capable of effectively distributing a capability identifier for a terminal device, decreasing signaling overhead caused by capability information reporting and storage. The method comprises: a terminal device, in a non-access stratum (NAS) process, acquiring a capability identifier of a network device for distribution to the terminal device; or, the terminal device, in a radio resource control (RRC) process, acquiring said capability identifier; the capability identifier being used to identify capability information of the terminal device.

26 Claims, 11 Drawing Sheets

(56) References Cited

OTHER PUBLICATIONS

3GPP TS 38.306 V15.1.0 (Mar. 2018)—3rd Generation Partnership Project; Technical Specification Group Radio Access Network; NR; User Equipment (UE) radio access capabilities (Release 15) (25 pages).
3GPP TSG RAN Meeting #83—RP-190122—Shenzhen, China, Mar. 18-21, 2019—SA2, LS on Completion of FS_RACS study—Release 16 (2 pages).
3GPP TSG-RAN2 Meeting #104—R2-1816463—Spokane, USA, Nov. 12-16, 2018—OPPO, Discussion on UE Capability Update (3 pages).
International Search Report dated Dec. 27, 2019 of PCT/CN2019/080246 (4 pages).
SA WG2 Meeting #130—S2-1901559—Feb. 25-Mar. 1, 2019, Santa Cruz—Tenerife, Spain—OPPO, RACS_UE manufacturer specific ID revert (4 pages).
Extended European Search Report for European Application No. 19920729.1 dated Nov. 12, 2021. 14 pages.
Intel "Storage of Manufacturer-specific UE Capability ID and interfaces" S2-1902434; SA WG2 Meeting #S2-131; Feb. 25-Mar. 1, 2019; 5 pages.
OPPO "Further Discussion on UE Capability ID based Solution" R2-1816462; 3GPP TSG-RAN2 Meeting #104; Nov. 12-16, 2018. 4 pages.
Qualcomm Inc. et al. "Signalling and assignment of UE Capability ID" S2-1902432; SA WG2 Meeting #131; Feb. 25-Mar. 1, 2019. 4 pages.
SA2 "LS on Completion of FS_RACS study" R2-1903039; 3GPP TSF Ran WG2 #105bis; Apr. 8-12, 2019; 2 pages.

\* cited by examiner

CAPABILITY IDENTIFIER DISTRIBUTION METHOD AND DEVICE

CROSS-REFERENCE TO RELATED APPLICATION

This application is a continuation application of International Application No. PCT/CN2019/080246, filed on Mar. 28, 2019, the entire disclosure of which is hereby incorporated by reference.

TECHNICAL FIELD

The present application relates to the field of communication, and in particularly to a method and a device for allocating a capability identifier.

BACKGROUND

With the development of 5G technology, or New Radio (NR) technology, terminal device will have more features and terminal devices will have more capability information as well. This not only brings huge signaling overhead, but also the core network needs to save the capability information of all terminal devices, which brings a great burden to the core network. Therefore, a capability information set of a specific terminal device can be associated with a capability identifier, thereby reducing the signaling overhead caused by reporting and storage of the capability information. At this time, how to allocate capability identifiers to terminal devices has become an urgent problem to be solved.

SUMMARY

The application provides a method and a device for allocating a capability identifier, which can effectively allocate capability identifiers to terminal devices.

In a first aspect, there is provided a method for allocating a capability identifier, the method including: acquiring, by a terminal device, a capability identifier allocated by a network device to the terminal device in a non-access stratum (NAS) process; or acquiring, by the terminal device, the capability identifier in a radio resource control (RRC) process; wherein the capability identifier is used to identify capability information of the terminal device.

In a second aspect, there is provided a method for allocating a capability identifier, the method including: sending, by a core network device, a capability identifier allocated to a terminal device in a non-access stratum (NAS) process, wherein the capability identifier is used to identify capability information of the terminal device.

In a third aspect, there is provided a method for allocating a capability identifier, the method including: sending, by an access network device, a capability identifier allocated to a terminal device in a non-access stratum (NAS) process; or sending, by the access network device, the capability identifier in a radio resource control (RRC) process; wherein the capability identifier is used to identify capability information of the terminal device.

In a fourth aspect, there is provided a method for allocating a capability identifier, the method including: allocating, by a UCMF entity, a capability identifier to a terminal device, wherein the capability identifier is used to identify capability information of the terminal device, and the capability identifier is sent to the terminal device in a NAS process or a RRC process.

In a fifth aspect, there is provided a terminal device, the terminal device may perform the method in the above first aspect or any optional implementation mode of the first aspect. Specifically, the terminal device may include function modules for performing the method in the above first aspect or any possible implementation mode of the first aspect.

In a sixth aspect, there is provided a core network device, the core network device may perform the method in the above second aspect or any optional implementation mode of the second aspect. Specifically, the core network device includes functional modules for performing the method in the above second aspect or any possible implementation mode of the second aspect.

In a seventh aspect, there is provided an access network device, the access network device may perform the method in the above third aspect or any optional implementation mode of the third aspect. Specifically, the access network device includes functional modules for performing the method in the above third aspect or any possible implementation mode of the third aspect.

In an eighth aspect, there is provided a UCMF entity, the UCMF entity may perform the method in the above fourth aspect or any optional implementation mode of the fourth aspect. Specifically, the network device may include functional modules for performing the method in the above fourth aspect or any possible implementation mode of the fourth aspect.

In a ninth aspect, there is provided a terminal device, including a processor and a memory. The memory is configured to store a computer program, and the processor is configured to call and run the computer program stored in the memory to perform the method in the above first aspect or any possible implementation mode of the first aspect.

In a tenth aspect, there is provided a core network device, including a processor and a memory. The memory is configured to store a computer program, and the processor is configured to call and run the computer program stored in the memory to perform the method in the above second aspect or any possible implementation mode of the second aspect.

In an eleventh aspect, there is provided an access network device, including a processor and a memory. The memory is configured to store a computer program, and the processor is configured to call and run the computer program stored in the memory to perform the method in the above third aspect or any possible implementation mode of the third aspect.

In a twelfth aspect, there is provided a UCMF entity including a processor and a memory. The memory is configured to store a computer program, and the processor is configured to call and run the computer program stored in the memory to perform the method in the above fourth aspect or any possible implementation mode of the fourth aspect.

In a thirteenth aspect, there is provided an apparatus for allocating a capability identifier, which is used to implement the method in the above first aspect or any possible implementation mode of the first aspect. Specifically, the apparatus includes a processor, configured to call and run a computer program from a memory, so that a device in which the apparatus is installed performs the method in the above first aspect or any possible implementation mode of the first aspect.

Optionally, the apparatus is a chip.

In a fourteenth aspect, there is provided an apparatus for allocating a capability identifier, which is used to implement the method in the above second aspect or any possible implementation mode of the second aspect. Specifically, the apparatus includes a processor, configured to call and run a computer program from a memory, so that a device in which the apparatus is installed performs the method in the above second aspect or any possible implementation mode of the second aspect.

Optionally, the apparatus is a chip.

In a fifteenth aspect, there is provided an apparatus for allocating a capability identifier, which is used to implement the method in the above third aspect or any possible implementation mode of the third aspect. Specifically, the apparatus includes a processor, configured to call and run a computer program from a memory, so that a device in which the apparatus is installed performs the method in the above third aspect or any possible implementation mode of the third aspect.

Optionally, the apparatus is a chip.

In a sixteenth aspect, there is provided an apparatus for allocating a capability identifier, which is used to implement the method in the above fourth aspect or any possible implementation mode of the fourth aspect. Specifically, the apparatus includes a processor, configured to call and run a computer program from a memory, so that a device in which the apparatus is installed performs the method in the above fourth aspect or any possible implementation mode of the fourth aspect.

Optionally, the apparatus is a chip.

In a seventeenth aspect, there is provided a computer readable medium, configured to store a computer program, wherein the computer program enables a computer to perform the method in the above first aspect or any possible implementation mode of the first aspect.

In an eighteenth aspect, there is provided a computer readable medium, configured to store a computer program, wherein the computer program enables a computer to perform the method in the above second aspect or any possible implementation mode of the second aspect.

In a nineteenth aspect, there is provided a computer readable medium, configured to store a computer program, wherein the computer program enables a computer to perform the method in the above third aspect or any possible implementation mode of the third aspect.

In a twentieth aspect, there is provided a computer readable medium, configured to store a computer program, wherein the computer program enables a computer to perform the method in the above fourth aspect or any possible implementation mode of the fourth aspect.

In a twenty-first aspect, there is provided a computer program product including computer program instructions, wherein the computer program instructions enable a computer to perform the method in the above first aspect or any possible implementation mode of the first aspect.

In a twenty-second aspect, there is provided a computer program product including computer program instructions, wherein the computer program instructions enable a computer to perform the method in the above second aspect or any possible implementation mode of the second aspect.

In a twenty-third aspect, there is provided a computer program product including computer program instructions, wherein the computer program instructions enable a computer to perform the method in the above third aspect or any possible implementation mode of the third aspect.

In a twenty-fourth aspect, there is provided a computer program product including computer program instructions, wherein the computer program instructions enable a computer to perform the method in the above fourth aspect or any possible implementation mode of the fourth aspect.

In a twenty-fifth aspect, there is provided a computer program. The computer program, when being run on a computer, enables the computer to perform the method in the above first aspect or any possible implementation mode of the first aspect.

In a twenty-sixth aspect, there is provided a computer program. The computer program, when being run on a computer, enables the computer to perform the method in the above second aspect or any possible implementation mode of the second aspect.

In a twenty-seventh aspect, there is provided a computer program. The computer program, when being run on a computer, enables the computer to perform the method in the above third aspect or any possible implementation mode of the third aspect.

In a twenty-eighth aspect, there is provided a computer program. The computer program, when being run on a computer, enables the computer to perform the method in the above fourth aspect or any possible implementation mode of the fourth aspect.

In a twenty-ninth aspect, there is provided a communication system, which includes the terminal device and at least one of the following network devices: an access network device, a core network device and a UCMF entity.

The terminal device is configured to acquire, in an NAS process, a capability identifier allocated by the network device to the terminal device; or acquire the capability identifier in an RRC process.

The access network device is configured to send, in the NAS process, the capability identifier allocated to the terminal device; or send, in the RRC process, the capability identifier allocated to the terminal device.

The core network device is configured to send, in the NAS process, the capability identifier allocated to the terminal device; or send, in the RRC process, the capability identifier allocated to the terminal device.

The UCMF entity is configured to allocate the capability identifier to the terminal device, wherein the capability identifier is sent to the terminal device in the non-access stratum (NAS) process or the radio resource control (RRC) process.

Herein, the capability identifier is used to identify capability information of the terminal device.

Based on the above technical scheme, the network device allocates the capability identifier to the terminal device in the NAS process or the RRC process, and the terminal device acquires the capability identifier allocated to it by the network side in the NAS process or the RRC process. The terminal device and network device associate the capability identifier with the capability information reported by the terminal device, so that the capability supported by the terminal device can be indicated by the capability identifier.

DETAILED DESCRIPTION

Technical solutions in the present application will be described below with reference to the accompanying drawings.

The technical solution of the implementations of the present application may be applied to various communication systems, such as a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN), Wireless Fidelity (WiFi), a future 5G system (or referred to as a New Radio (NR) system) or another communication system, etc.

Generally speaking, a conventional communication system supports a limited number of connections and is easy to implement. However, with a development of communication technology, a mobile communication system will not only support traditional communication, but also support, for example, Device to Device (D2D) communication, Machine to Machine (M2M) communication, Machine Type Communication (MTC), and Vehicle to Vehicle (V2V) communication. The implementations of the present application may also be applied to these communication systems.

Optionally, a communication system in an implementation of the present application may be applied to a Carrier Aggregation (CA) scenario, a Dual Connectivity (DC) scenario, and a Standalone (SA) network deployment scenario.

Figure 1:
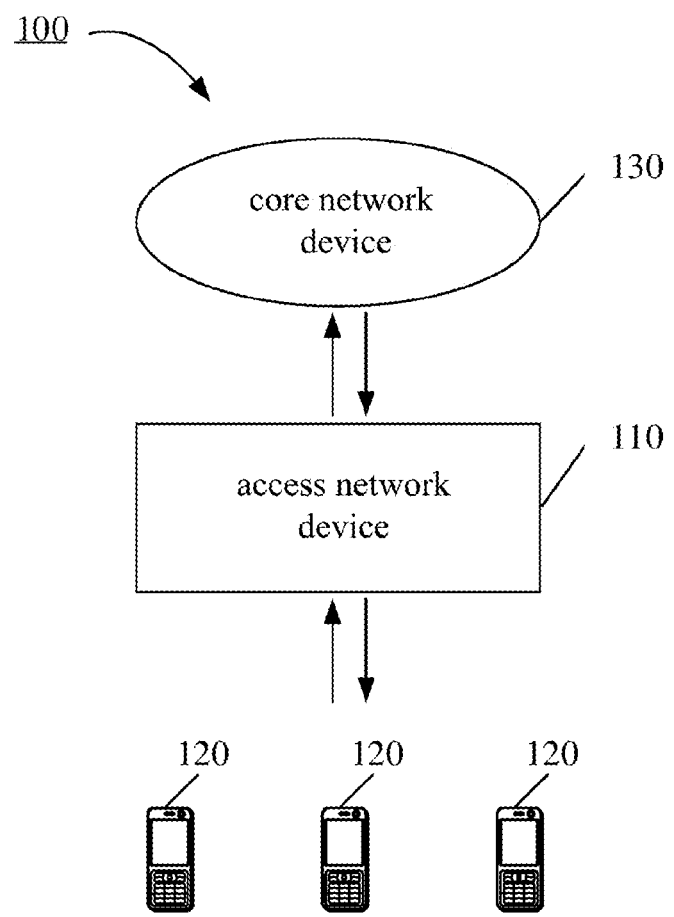
FIG. 1 is a schematic diagram of a possible wireless communication system applied by an implementation of the present application.

FIG. 1 is a schematic diagram of a possible wireless communication system applied by an implementation of the present application. The wireless communication system 100 may include an access network device 110. The access network device 110 may be a device that communicates with a terminal device.

The access network device 110 may provide communication coverage for a specific geographic area and may communicate with a terminal device located within the coverage area. The network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a future network side device, or a network device in a future evolved Public Land Mobile Network (PLMN), etc.

The communication system 100 further includes at least one terminal device 120 located within the coverage area of the access network device 110.

The terminal device 120 may be mobile or fixed. Optionally, the terminal device 120 may refer to user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, an in-vehicle device, a wearable device, a terminal device in a future 5G network, a terminal device in a future evolved Public Land Mobile Network (PLMN), or the like, which are not limited in the implementations of the present application. Herein, optionally, a Device to Device (D2D) communication may also be performed between the terminal devices 120.

The access network device 110 provides services for a cell, and the terminal devices 120 communicate with the access network device 110 through transmission resources (e.g., frequency domain resources or spectrum resources) used by the cell. The cell may be a cell corresponding to the access network device 110 (e.g., base station), and the cell may include a macro base station or a base station corresponding to a Small cell. The small cells here may include: a Metro cell, a Micro cell, a Pico cell, a Femto cell, etc. These small cells have the characteristics of small coverage and low transmission power, and are suitable for providing high-speed data transmission services.

The communication system 100 further includes a core network device 130 that communicates with the access network device 110.

The core network device 130 may be a core network device of a 5G system. The core network device may be, for example, an access and mobility management function (AMF) which is responsible for access and mobility management and has functions such as authentication for users, handover and location update; for another example, a Session Management Function (SMF) which is responsible for session management, including the establishment, modification, and release of Packet Data Unit (PDU) sessions; for another example, a User Plane Function (UPF), which is responsible for forwarding user data. Optionally, the core network device 130 may also be a core network device of an LTE system or other systems.

FIG. 1 shows one access network device, one core network device and three terminal devices as an example, but the present application is not limited thereto. Optionally, the wireless communication system 100 may include multiple core network devices, or may include multiple access network devices, and other quantity of terminal devices may be included within the coverage area of each access network device, which is not limited in the implementations of the present application.

Generally, when a terminal device registers or updates its registration, it will report its capability information to an access network device, and then the access network device will send the capability information of the terminal device to a core network device and the core network device will save the capability information. When a terminal device initiates an RRC connection establishment request, the access network device will request the core network device for the capability information of the terminal device, thereby providing configuration to the terminal device according to the capability information of the terminal device.

With more and more features supported by a terminal device, there will be more and more capability information of the terminal device, which leads to a huge signaling overhead. At the same time, the core network device needs to save the registered capability information of all terminal devices, which also brings a great challenge to the core network.

Therefore, a capability information set supported by the terminal device may be associated with a capability identifier, and indication of the capability information set can be achieved through the capability identifier, thereby reducing the signaling overhead caused by reporting and storage of the capability information. The capability identifiers of the terminal devices may be allocated by an operator.

In order to implement the allocation of the capability identifiers, an implementation of the present application provides a method for allocating a capability identifier, thereby the network device can effectively allocate a capability identifier to a terminal device.

In an implementation of the present application, the network device may send the capability identifier to the terminal device through a Non-Access Stratum (NAS) process or a Radio Resource Control (RRC) process. The network device may be, for example, a core network device or an access network device. The core network device may be AMF, for example. The access network device may be gNB, for example.

For example, the core network device may send the capability identifier to the terminal device in the NAS process or the RRC process, and the access network device may send the capability identifier to the terminal device in the NAS process.

It should be understood that sending the capability identifier in the NAS process may refer to that the capability identifier is sent to the terminal device through a NAS message, that is, the capability identifier is encapsulated in the NAS message. Sending the capability identifier in the RRC process may refer to that the capability identifier is sent to the terminal device through an RRC message, and the capability identifier is encapsulated in the RRC message.

The capability information of the terminal device is not limited in the implementation of the present application. For example, the capability information may be capability information of Radio Capability of terminal device, capability information of Public Land Mobile Network (PLMN), system capability information, band capability information, band combination capability information, terminal type capability information, and the like.

Figure 2:
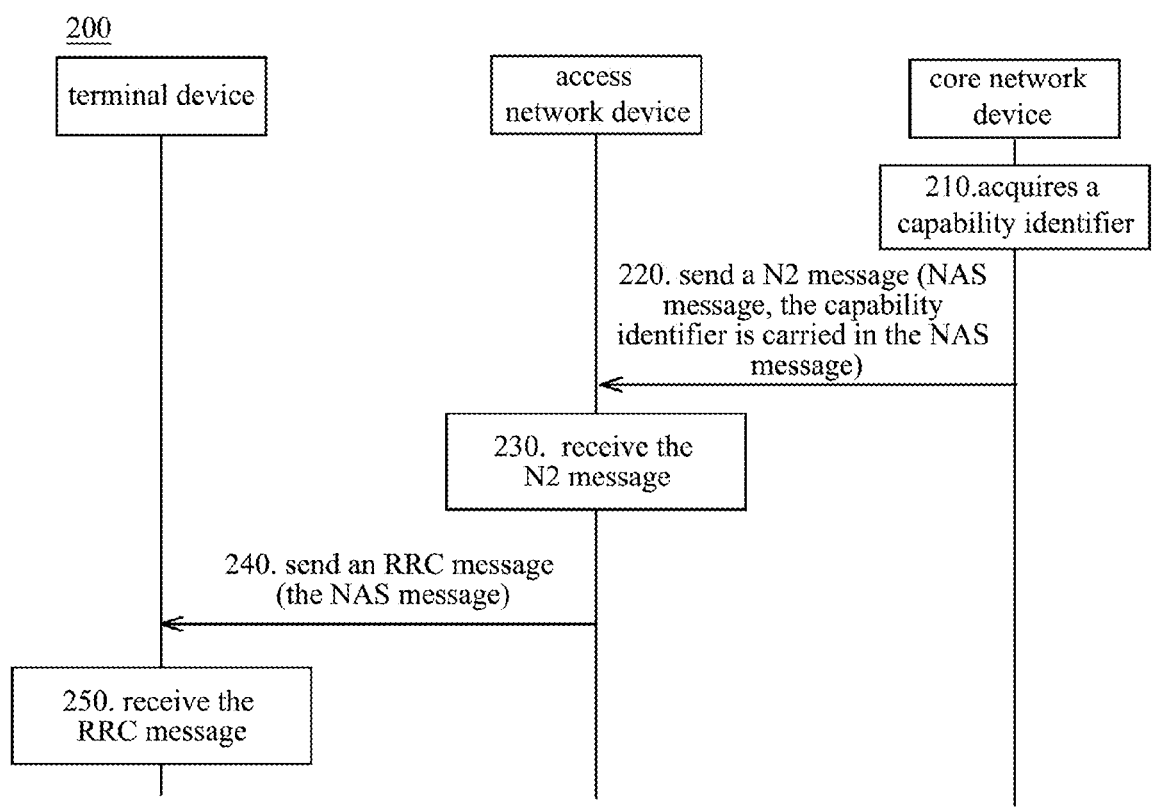
FIG. 2 is a flow interaction diagram of a method for allocating a capability identifier in a NAS process according to an implementation of the present application.
Figure 3:
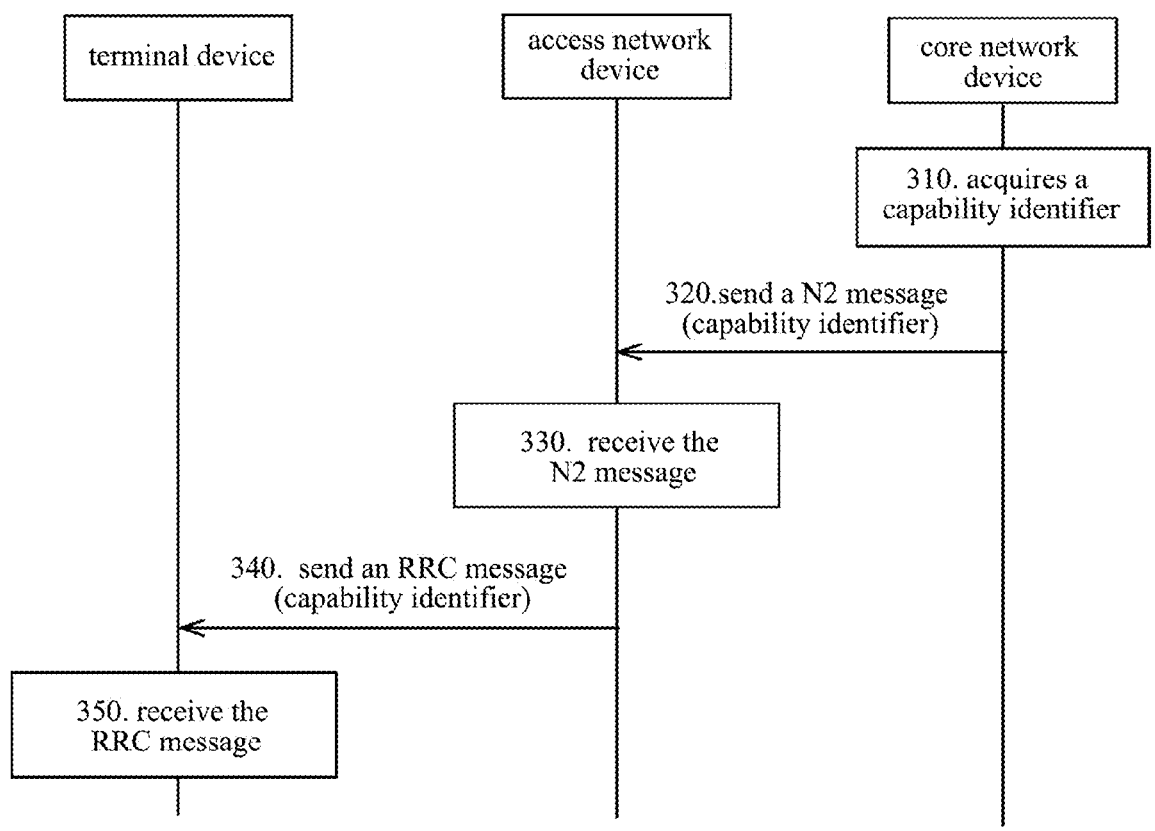
FIG. 3 is a flow interaction diagram of a method for allocating a capability identifier in an RRC process according to an implementation of the present application.

FIG. 2 and FIG. 3 are flow interaction diagrams of methods for allocating capability identifier according to an implementation of the present application. The methods shown in FIG. 2 and FIG. 3 may be performed by network entities such as terminal device, Radio Access Network (RAN) device, core network (CN) or UE Capability Management Function (UCMF) entity. The terminal device may be, for example, the terminal device 120 shown in FIG. 1, the core network device may be, for example, the core network device 130 shown in FIG. 1, and the access network device may be, for example, the access network device 110 shown in FIG. 1.

As shown in FIG. 2, in the NAS process, the terminal device acquires a capability identifier allocated to it by the network. The method 200 for allocating a capability identifier includes some or all of the following acts.

In 210, a core network device acquires a capability identifier.

The capability identifier may be allocated by the core network device to the terminal device, or may be allocated by the UCMF entity to the terminal device.

The capability identifier is used to identify capability information of the terminal device, and the capability identifier is sent to the terminal device in a NAS process or an RRC process.

When the UCMF entity allocates a capability identifier to the terminal device, optionally, the core network device may send a capability identifier enquiry message to the UCMF entity, wherein the capability identifier enquiry message is used to instruct the UCMF entity to allocate the capability identifier to the terminal device. In response to the capability identifier enquiry message, the UCMF entity sends to the core network device the capability identifier allocated by the UCMF entity to the terminal device, and the core network device receives the capability identifier sent by the UCMF entity.

In 220, the core network device sends an N2 message to an access network device.

The N2 message carries a NAS message. The NAS message carries a capability identifier, that is, the capability identifier is encapsulated in the NAS message. The NAS message may be, for example, a registration request message, a registration acceptance message, a registration update message, or the like.

In 230, the access network device receives the N2 message sent by the core network device.

In 240, the access network device sends an RRC message to the terminal device.

The RRC message carries the NAS message.

Specifically, after receiving the N2 message, the access network device acquires the NAS message from the N2 message, encapsulates the NAS message in the RRC message, and sends the RRC message carrying the NAS message to the terminal device.

In 250, the terminal device receives the RRC message sent by the access network device.

From RRC message, the terminal device acquires the NAS message from core network device, and acquires the capability identifier from the NAS message.

As shown in FIG. 3, in the RRC process, the terminal device acquires the capability identifier allocated to it by the network. The method 300 for allocating a capability identifier includes some or all of the following acts.

In 310, a core network device acquires a capability identifier.

The related description on act 210 in FIG. 2 may be referred to for the process of acquiring the capability identifier by the core network device in 310, which will not be repeated here for brevity.

In 320, the core network device sends an N2 message to an access network device.

The N2 message carries the capability identifier.

In 330, the access network device receives the N2 message sent by the core network device.

In 340, the access network device sends an RRC message to the terminal device.

The RRC message carries the capability identifier.

Specifically, after receiving the N2 message, the access network device acquires the capability identifier in the N2 message, encapsulates the capability identifier in an RRC message, and sends an RRC message carrying the capability identifier to the terminal device.

Therefore, the network device sends the capability identifier to the terminal device in the NAS process or RRC process, so that in the NAS process or RRC process the terminal device obtains the capability identifier allocated to it by the network side. The terminal device and the network device may associate the capability identifier with the capability information reported by the terminal device, so that a capability supported by the terminal device can be indicated by the capability identifier, and the signaling overhead caused by reporting and storage of the capability information is reduced.

In the method 200 shown in FIG. 2, the terminal device acquires the capability identifier in the NAS process, that is, the terminal device acquires the capability identifier through a NAS message. The core network device encapsulates the capability identifier in the NAS message and sends the NAS message to the terminal device. The terminal device acquires the capability identifier from the NAS message.

It should be understood that the NAS messages is a message transmitted between the core network and terminal device. In a transmission process of the NAS message, the core network device may encapsulate the NAS message in the N2 message and send it to the access network device. After the access network device obtains the NAS message from the N2 message, the access network device may encapsulate the NAS message in RRC message and send it to the terminal device. The N2 message is a message transmitted between the core network device and the access network device, and the RRC message is a message transmitted between the access network device and the terminal device. The access network device only forwards the NAS message, and cannot obtain the capability identifier carried in the NAS message.

In the method 300 shown in FIG. 3, the terminal device acquires the capability identifier in the RRC process, that is, the terminal device acquires the capability identifier through an RRC message. The core network device sends the capability identifier to the access network device, and after receiving the capability identifier, the access network device encapsulates the capability identifier in an RRC message and sends it to the terminal device. After receiving the RRC message, the terminal device acquires the capability identifier from the RRC message.

The capability identifier allocated by the network device to the terminal device is used to identify capability information of the terminal device. Different capability identifiers may be used to indicate different capability sets supported by the terminal device. Therefore, the terminal device and the network device need to know not only the capability identifier allocated by the network device to the terminal device, but also the capability supported by the terminal device.

Optionally, the method further includes:

the access network device sends a capability enquiry message to the terminal device;

terminal device receives the capability enquiry message sent by the access network device;

in response to the capability enquiry message, the terminal device sends its capability information to the access network device; and the access network device receives the capability information sent by the terminal device.

The capability enquiry message is used to instruct the terminal device to report the capability of the terminal device.

For example, the access network device may determine the capability that needs to be reported by the terminal device according to filter information, and instruct the terminal device to report the capability that needs to be reported through the capability enquiry message. That is to say, the filter information is used to filter out the capability that the network device needs the terminal device to report among various capabilities.

The access network device may obtain the filter information from the UCMF or the core network device.

When the core network device does not request the capability identifier from the UCMF entity, the UCMF may only send the filter information to the core network device, and the capability identifier is allocated by the core network device. Or, the core network device may also request the UCMF to acquire the filter information and the capability identifier, and the UCMF allocates the capability identifier to the terminal device and sends the filter information and the capability identifier to the core network device. The core network device sends the filter information to the access network device, so that the access network device may send the capability enquiry message to the terminal device according to the filter information, so as to instruct the terminal device to report the corresponding capability information.

In addition, for the access network device, the access network device may acquire the capability identifier from the core network device or from the terminal device. The access network device may acquire the capability identifier in the above-mentioned allocation process of the capability identifier, and may also acquire the capability identifier from the core network device when the capability identifier needs to be used in a later stage.

The terminal device, the core network device, access network device and the UCMF entity, after acquiring the capability identifier and capability information of terminal device, associate the capability information reported by terminal device with the capability identifier, that is, establish a corresponding relation between the capability information and the capability identifier, and store the corresponding relationship.

For example, after receiving the capability information sent by the terminal device, the access network device sends the capability information to the core network device, the core network device receives the capability information, associates the capability information with the capability identifier, and stores the associated capability information and the capability identifier.

For another example, after acquiring the capability information, the core network device sends the capability information of the terminal device to the UCMF entity, and the UCMF entity receives the capability information and stores the capability information and the capability identifier, thereby managing the capability information and the capability identifier. In addition, if the capability identifier of the terminal device is allocated by the core network device, the core network device may also send the capability identifier to the UCMF entity.

It should be understood that sending the capability enquiry message by the core network device and reporting the capability information by the terminal device may occur before or after any act in FIG. 2 and FIG. 3. For example, the access network device may first obtain the capability information of the terminal device from the terminal device, and then send the capability identifier to the terminal device. The access network device may alternatively first send the capability identifier to the terminal device, and then acquire the capability information of the terminal device from the terminal device. There is no restriction here.

Through the above process, the terminal device, the access network device, the core network device and the UCMF can obtain the corresponding relation between the capability information reported by the terminal device and the capability identifier allocated to the terminal device, and indicate the capability information through the capability identifier, thereby reducing the signaling overhead caused by reporting and storage of the capability information.

After the core network device acquires the capability identifier from the UCMF or allocates the capability identifier to the terminal device, the core network device may send the capability identifier on the one hand and receive the capability information of the terminal device on the other hand. The order of receiving the capability information and sending the capability identification by the core network device is not limited in the implementation of the present application.

For example, the core network device may first send a NAS message carrying the capability identifier to the terminal device, and then receive the capability information of the terminal device sent by the access network device. Or, the core network device may first receive the capability information of the terminal device, and then send the NAS message carrying the capability identifier to the terminal device.

Similarly, after the UCMF entity allocates the capability identifier to the terminal device, the UCMF entity also needs to send the capability identifier and receive the capability information of the terminal device. The order of receiving the capability information and the sending capability identification by the UCMF entity is not limited in the implementation of the present application.

For example, after acquiring the capability information of the terminal device, the core network device may send the capability information to the UCMF entity and request the capability identifier from the UCMF entity. Therefore, after receiving the capability information, the UCMF entity sends to the core network device the capability identifier allocated by the UCMF entity to the terminal device.

For another example, the core network device may first request the capability identifier from the UCMF entity, and then send the capability information of the terminal device to the UCMF entity after transmitting the capability identifier to the terminal device.

In an implementation of the present application, the NAS process includes processes such as a registration process, a configuration update process or the like, and the RRC process includes processes such as an RRC reconfiguration process, a capability information acquisition process, an RRC message transmission process or the like.

For example, the NAS message in FIG. 2 may be a registration accept complete message, and the registration accept complete message carries the capability identifier.

The terminal device may send a registration request message to the access network device. In response to the registration request message, the access network device sends a registration acceptance message to the terminal device. The terminal device accepts the registration acceptance message. The capability identifier is encapsulated in the registration acceptance message.

Optionally, the method further includes: in response to the registration accept message, the terminal device sends a Registration accept complete message to the access network device; the access network device receives the registration accept complete message sent by the terminal device; the access network device forwards the registration accept complete message to the core network device; and the core network device receives the registration accept complete message sent by the access network device.

Optionally, the registration accept complete message may carry the capability identifier.

For another example, the NAS message in FIG. 2 may be a configuration update command, wherein the configuration update command carries the capability identifier.

Optionally, the method further includes:

in response to the configuration update command, the terminal device sends a UE Configuration Update Complete message to the access network device;

the access network device receives the configuration update complete message sent by the terminal device;

the access network device forwards the configuration update complete message to the core network device; and the core network device receives the configuration update complete message sent by the access network device.

Optionally, the capability identifier is carried in the configuration update complete message.

For another example, the RRC message in FIG. 3 may be a capability enquiry message, wherein the capability enquiry message carries the capability identifier.

Optionally, the method further includes: in response to the capability enquiry message, the terminal device sends the capability information of the terminal device to the access network device; the access network device receives the capability information of the terminal device sent by the terminal device.

Optionally, the method further includes: the terminal device sends an RRC message to the access network device, wherein the RRC message includes both the capability information and the capability identifier.

With reference to FIGS. 4 to 8, how the terminal device acquires the capability identifier in these processes will be described in detail below.

Figure 4:
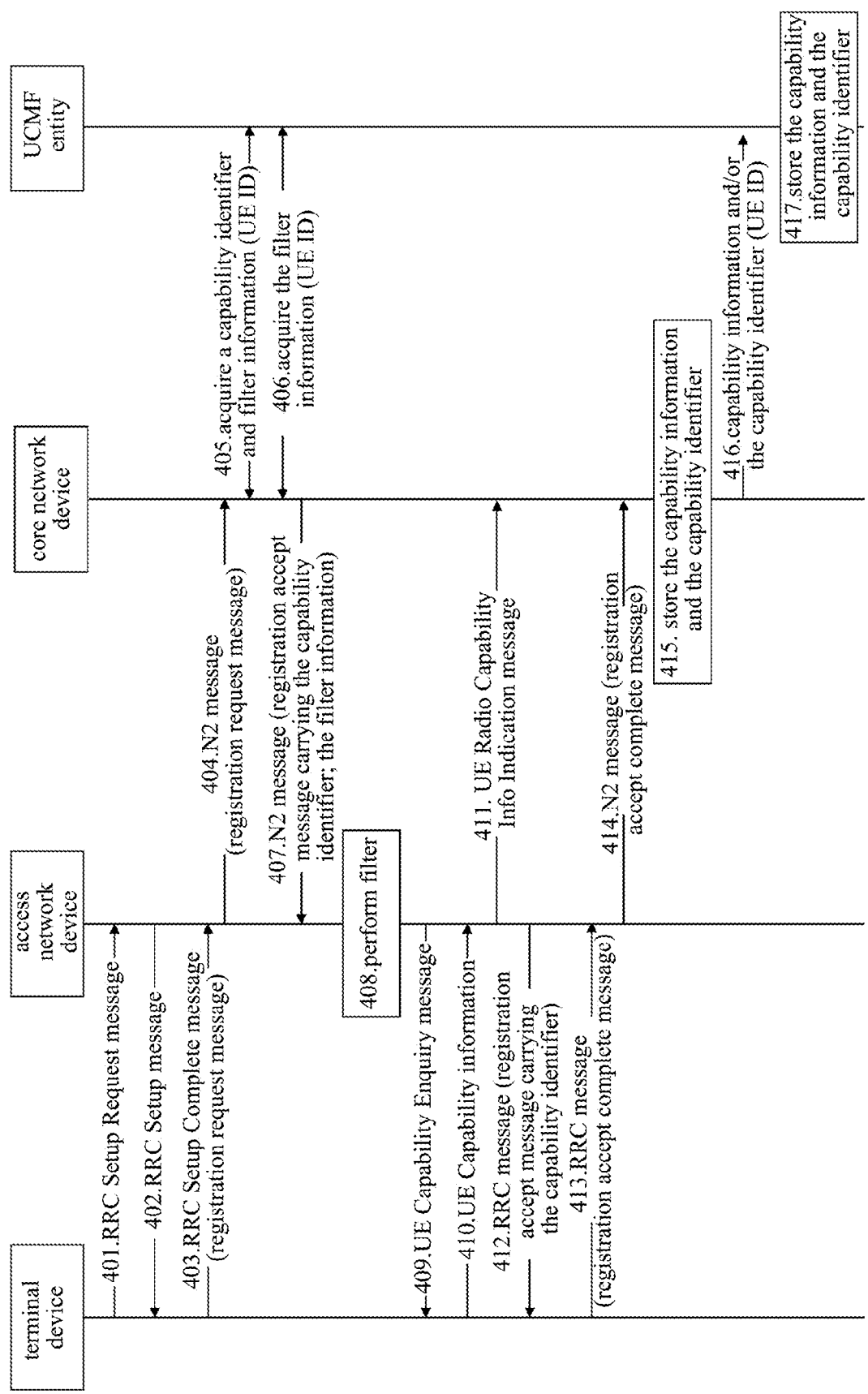
FIG. 4 is a flow interaction diagram of a possible mode of allocating a capability identifier according to an implementation of the present application.
Figure 5:
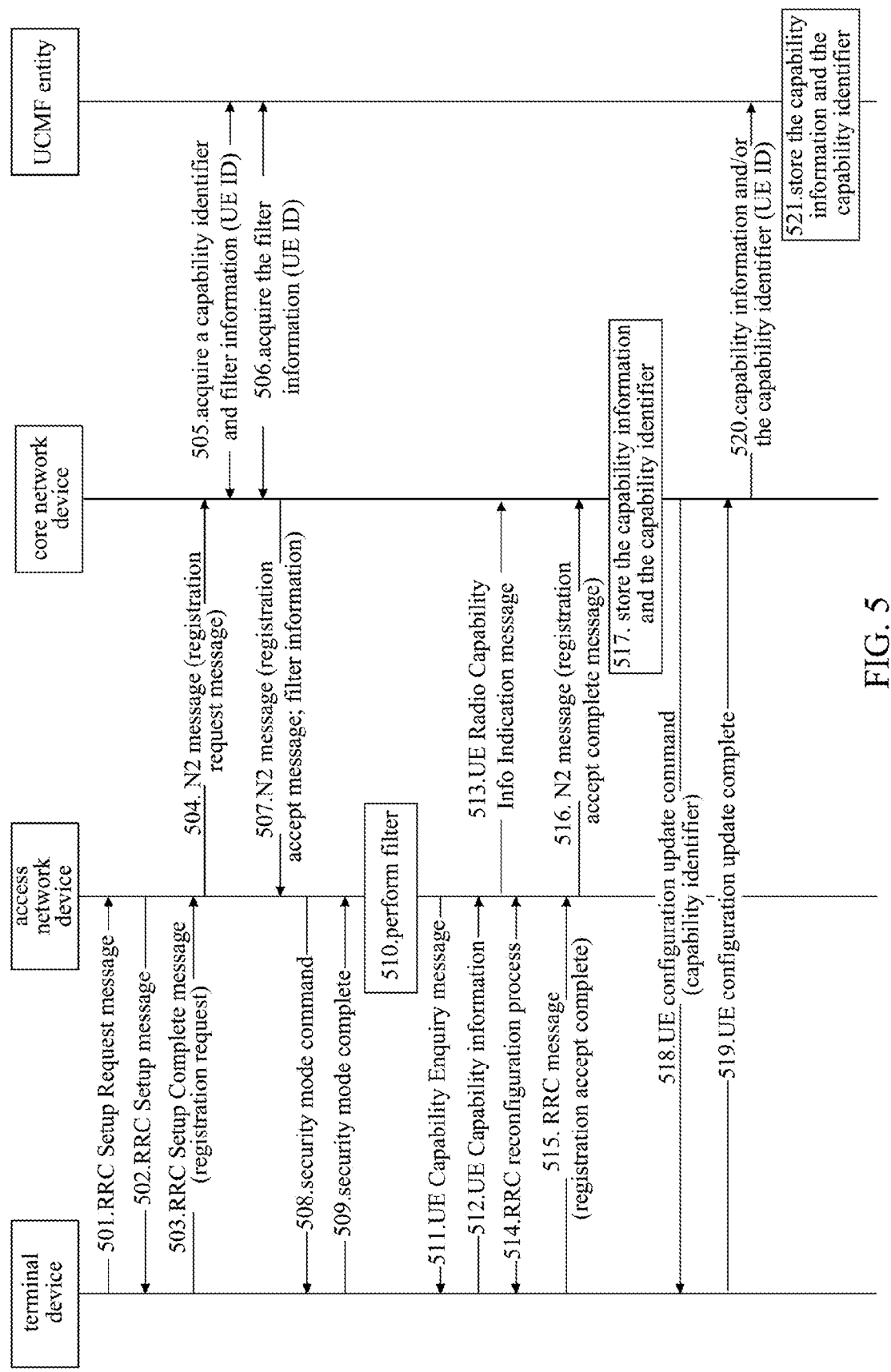
FIG. 5 is a flow interaction diagram of a possible mode of allocating a capability identifier according to an implementation of the present application.
Figure 6:
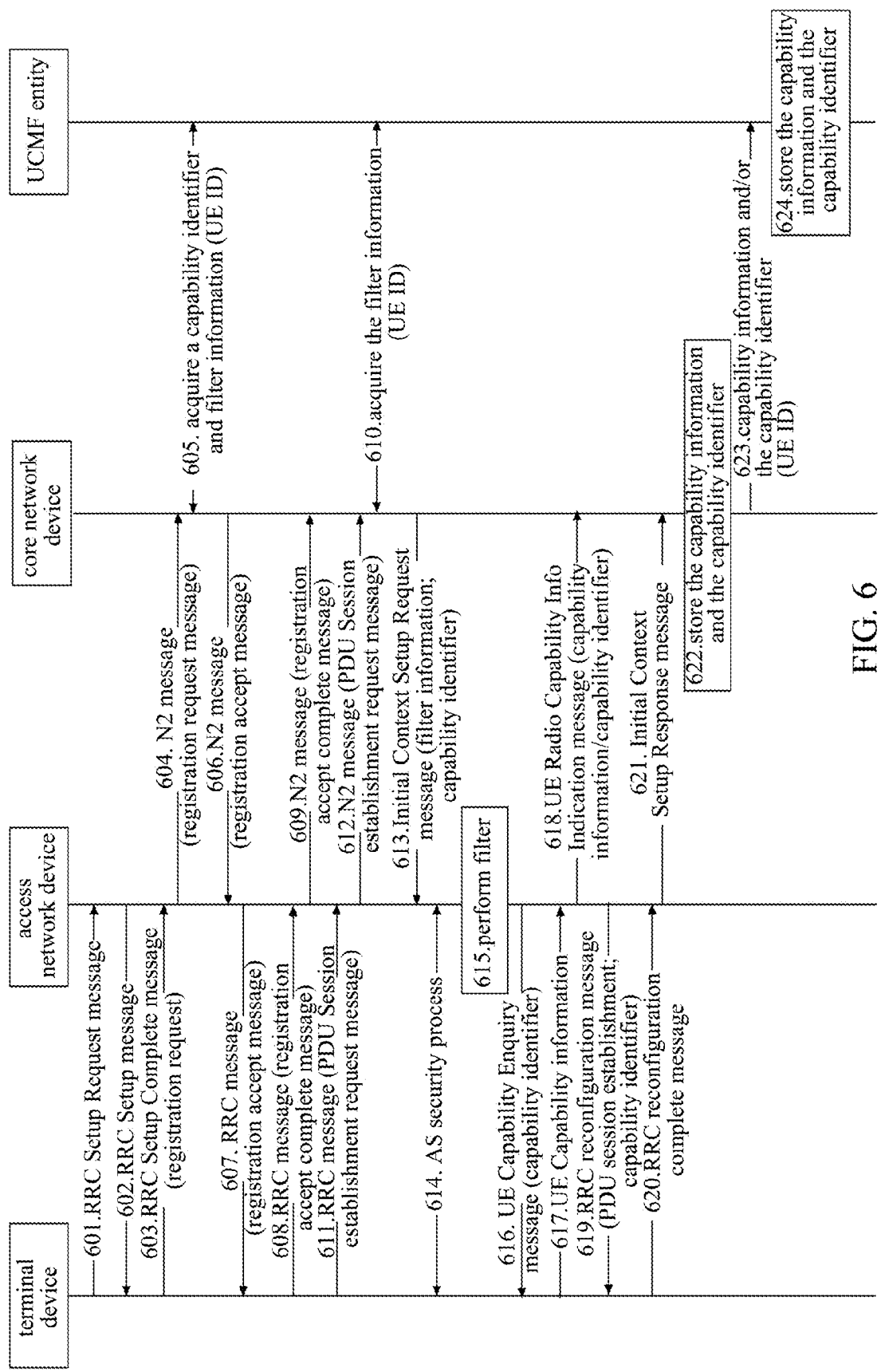
FIG. 6 is a flow interaction diagram of a possible mode of allocating a capability identifier according to an implementation of the present application.
Figure 7:
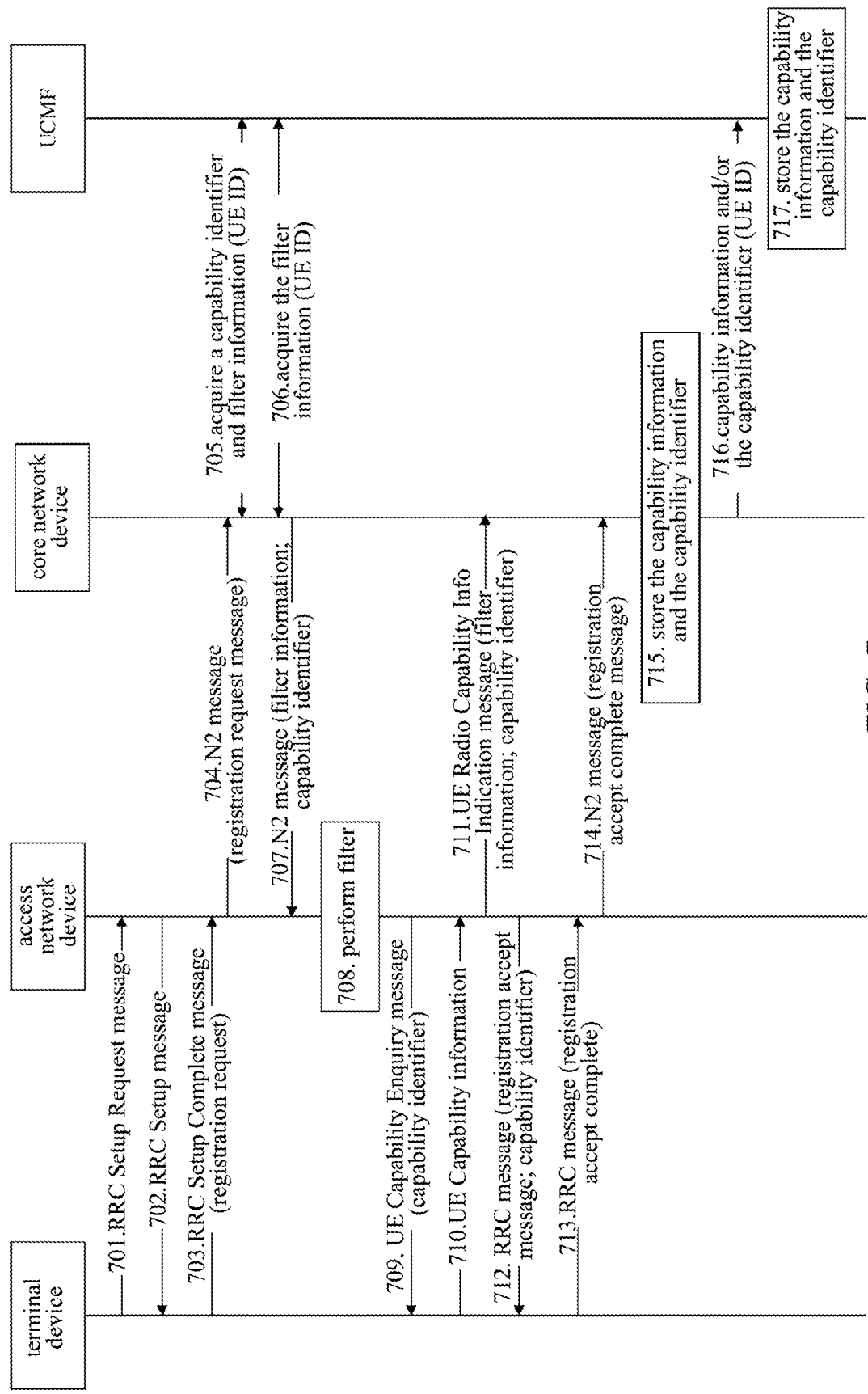
FIG. 7 is a flow interaction diagram of a possible mode of allocating a capability identifier according to an implementation of the present application.
Figure 8:
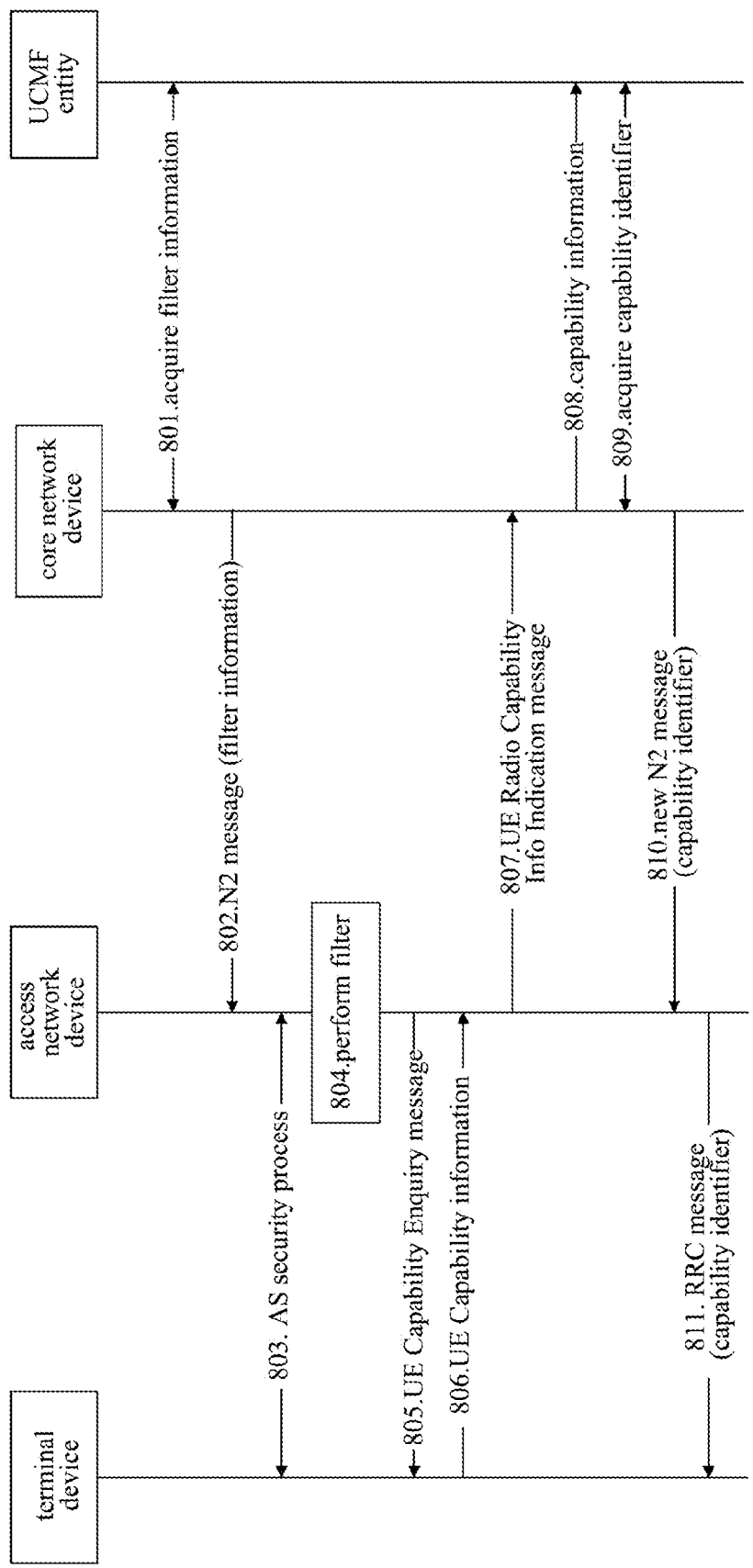
FIG. 8 is a flow interaction diagram of a possible mode of allocating a capability identifier according to an implementation of the present application.

FIG. 4 and FIG. 5 are flow interaction diagrams of methods for acquiring a capability identifier from a NAS message by a terminal device, and FIG. 6 to FIG. 8 are flow interaction diagrams of methods for acquiring a capability identifier from an RRC message by a terminal device.

FIGS. 4 to 8 show a terminal device, an access network device, a core network device and a UCMF entity.

As shown in FIG. 4, the network device allocates a capability identifier to the terminal device in a registration process. The method of the implementation of the present application may include some or all of the acts in FIG. 4:

In 401, a terminal device sends an RRC Setup Request message to an access network device.

In 402, in response to the RRC setup request message, the access network device sends an RRC Setup message to the terminal device.

In 403, the terminal device sends an RRC Setup Complete message to the access network device.

The RRC setup complete message carries a Registration Request message.

In 403, the terminal device may also report indication information for indicating whether the network device is supported to allocate the capability identifier, wherein the indication information may be encapsulated in a NAS message such as a registration request message or a registration update message, and the indication information may also be encapsulated in the RRC setup complete message.

In 404, the access network device sends an N2 message to a core network device.

The N2 message is, for example, an INITIAL UE MESSAGE.

The access network device establishes an N2 connection for the terminal device, carries the registration request message received in 403 in the N2 message, and sends the N2 message to the core network device. If the indication information for indicating whether the network device is supported to allocate the capability identifier is carried in the RRC setup complete message, the access network device also carries the indication information in the N2 message.

Then 405 or 406 is executed.

After the core network device receives the registration request message from the terminal device, if at this time the core network device does not obtain the filter information of the terminal device's capability, act 405 or act 406 is executed.

In 405, the core network device acquires a capability identifier and filter retrieve information (referred to as filter information for short) from the UCMF entity.

Specifically, the core network device may send a request message to the UCMF entity for requesting the capability identifier and the filter information, wherein the request message carries the UE Identify (UE ID) of the terminal device. The UCMF sends the filter information and the capability identifier to the core network device according to the request message, which carries the UE ID.

In 406, the core network device acquires the filter information from the UCMF.

Specifically, the core network device may send to the UCMF entity a request message for requesting the filter information, which carries the UE ID. The UCMF sends the filter information to the core network device according to the request message, which carries the UE ID.

If 405 is executed, the UCMF allocates a capability identifier to the terminal device, and sends the capability identifier and the filter information to the core network device.

If act 406 is executed, the core network device allocates a capability identifier to the terminal device, and the core network device acquires the filter information from the UCMF.

In 407, the core network device sends an N2 message to the access network device.

The N2 message carries a NAS message, wherein the NAS message is, for example, a Registration accept message. The capability identifier is encapsulated in the registration accept message, and the capability identifier is transmitted as a part of the NAS message.

The N2 message further carries the filter information.

Optionally, the N2 message further carries the capability identifier. At this time, it should be noted that the capability identifier carried by the N2 message is for sending to the access network device. The capability identifier and the registration accept message are both encapsulated in the N2 message. The same capability identifier is also encapsulated in the registration accept message, and the capability identifier encapsulated in the registration accept message is for sending to the terminal device.

In 408, the access network device performs Enforce filter according to the filter message.

The access network device may determine the capability information that the terminal device needs to report according to the filter information.

In 409, the access network device sends a UE Capability Enquiry message to the terminal device.

The UE capability enquiry message (referred to as capability enquiry message for short) is used to instruct the terminal device to report capability information that the network device needs to report.

In 410, in response to the UE capability enquiry message, the terminal device sends UE Capability Information of the terminal device to the access network device.

In 411, the access network device sends a UE RADIO CAPABILITY INFO INDICATION message to the core network device.

The UE RADIO CAPABILITY INFO INDICATION message is used to indicate the capability information reported by the terminal device.

In 412, the access network device sends an RRC message to the terminal device.

The RRC message carries, for example, the registration accept message received by the access network device in 407, and the registration accept message carries the capability identifier.

After obtaining the capability identifier, the terminal device may associate the capability identifier with the capability information reported by the terminal device in 410, and store an association relation between the capability identifier and the capability information.

In 413, the terminal device sends an RRC message to the access network device.

The RRC message carries a registration accept complete message.

Optionally, the RRC message further carries the capability identifier.

In 414, the access network device sends an uplink N2 message to the core network device.

The N2 message carries the Registration accept complete message.

In 415, the core network device stores the capability information and the capability identifier.

The core network device associates the capability information with the capability identifier, and stores the association relation.

In 416, the core network device sends the capability information to the UCMF entity, which carries the UE ID.

Optionally, the core network device also sends the capability identifier to the UCMF entity.

In 417, the UCMF entity stores the capability information and the capability identifier.

The UCMF entity is configured to manage the capability information and the capability identification.

In FIG. 4, act 407 and act 412 enable the terminal device to obtain the capability identifier from a NAS message, such as a registration accept message.

As shown in FIG. 5, the network device allocates a capability identifier to the terminal device in a configuration update process. The method of the implementation of the present application may include some or all of the acts in FIG. 5:

In 501, a terminal device sends an RRC Setup Request message to an access network device.

In 502, the access network device sends an RRC Setup message to the terminal device.

In 503, the terminal device sends an RRC Setup Complete message to the access network device.

The RRC setup complete message carries a Registration Request message.

In 503, the terminal device may also report indication information for indicating whether the network device is supported to allocate the capability identifier, wherein the indication information may be encapsulated in a NAS message such as a registration request message or a registration update message, and the indication information may also be encapsulated in the RRC setup complete message.

In 504, the access network device sends an N2 message to a core network device.

The N2 message is, for example, an INITIAL UE MESSAGE.

The access network device establishes an N2 connection for the terminal device, carries the registration request message received in 403 in the N2 message, and sends the N2 message to the core network device. If the indication information for indicating whether the network device is supported to allocate the capability identifier is carried in the RRC setup complete message, the access network device further carries the indication information in the N2 message.

Then 505 or 506 is then executed.

After the core network device receives the registration request message from the terminal device, if at this time the core network device does not obtain the filter information of the terminal device's capability, the core network device executes act 405 or act 406.

In 505, the core network device acquires a capability identifier and filter information from a UCMF entity.

Specifically, the core network device may send a request message to the UCMF entity for requesting the capability identifier and the filter information, wherein the request message carries a UE ID of the terminal device. The UCMF sends the filter information and the capability identifier to the core network device according to the request message, which carries the UE ID.

In 506, the core network device acquires the filter information from the UCMF entity.

Specifically, the core network device may send to the UCMF entity a request message for requesting the filter information, which carries the UE ID. The UCMF sends the filter information to the core network device according to the request message, which carries the UE ID.

If 505 is executed, the UCMF allocates a capability identifier to the terminal device, and sends the capability identifier and the filter information to the core network device.

If act 506 is executed, the core network device allocates a capability identifier to the terminal device, and the core network device acquires the filter information from the UCMF.

In 507, the core network device sends an N2 message to the access network device.

The N2 message carries a NAS message, wherein the NAS message is, for example, a Registration accept message.

The N2 message may further carry the filter information.

Optionally, the N2 message further carries the capability identifier.

Then, a security mode, i.e., acts 508-509, are started.

In 508, the access network device sends a Security Mode Command to the terminal device.

In 509, in response to the security mode command, the terminal device sends a Security Mode Complete message to the access network device.

In 510, the access network device performs Enforce filter according to the filter message.

The access network device may determine the capability information that the terminal device needs to report according to the filter information.

In 511, the access network device sends a UE Capability Enquiry message to the terminal device.

In 512, in response to the UE capability enquiry message, the terminal device sends UE Capability Information of the terminal device to the access network device.

In 513, the access network device sends a UE RADIO CAPABILITY INFO INDICATION (indication information) message to the core network device.

The UE capability information indication message is used to indicate the capability information reported by the terminal device.

In 514, a RRC reconfiguration process is executed.

In 515, the terminal device sends an RRC message to the access network device.

The RRC message carries a Registration accept complete message.

In 516, the access network device sends an N2 message to the core network device.

The N2 message carries the registration accept complete message.

In 517, the core network device stores the capability information and the capability identifier.

The core network device associates the capability information with the capability identifier, and stores the association relation.

In 518, the core network device sends a UE Configuration Update Command (also referred to as a UCU message) to the terminal device.

The UE configuration update command (referred to as configuration update command for short) carries the capability identifier.

Specifically, since the UE configuration update command is a NAS message, the core network device may send an N2 message to the access network device, and the N2 message carries the UE configuration update command. The access network device acquires the UE configuration update command after receiving the N2 message, and sends the UE configuration update command to the terminal device through a RRC message.

After receiving the UE configuration update command, the terminal device acquires the capability identifier therefrom.

The terminal device may associate the capability information reported by the terminal device in act 512 with the capability identifier, and save the association relation.

In 519, in response to the UE configuration update command, the terminal device sends a UE Configuration Update Complete message to the core network device.

Specifically, since the UE configuration update complete message is a NAS message, the terminal device may send an RRC message to the access network device, and the RRC message carries the UE configuration update complete message. After receiving the RRC message, the access network device acquires the UE configuration update complete message and sends the UE configuration update complete message to the core network device through an N2 message.

Optionally, the UE configuration update complete message carries the capability identifier.

It can be seen that in FIG. 5, the core network device sends the capability identifier to the terminal device after the core network obtains the capability information of the terminal device. That is, act 518 is executed after act 513. After receiving the capability information sent by the access network device, the core network device sends the capability identifier to the terminal device.

While in FIG. 4, the core network device sends the capability identifier to the terminal device before the core network receives the capability information of the terminal device. That is, act 407 is executed before act 411. The core network device first sends the capability identifier to the terminal device, and then receives the capability information sent by the access network device.

In 520, the core network device sends the capability information to the UCMF entity, which carries the UE ID.

Optionally, the core network device also sends the capability identifier to the UCMF entity.

In 521, the UCMF entity stores the capability information and the capability identifier.

The UCMF entity is configured to manage the capability information and the capability identification.

In FIG. 5, act 518 enables the terminal device to obtain the capability identifier from a NAS message such as a UE configuration update command.

As shown in FIG. 6, the network device allocates a capability identifier to the terminal device in the RRC process, in which a Data Radio Bearer (DRB) is established. The method of the implementation of the present application may include some or all of the acts in FIG. 6:

In 601, a terminal device sends an RRC Setup Request message to an access network device.

In 602, the access network device sends an RRC Setup message to the terminal device.

In 603, the terminal device sends an RRC Setup Complete message to the access network device.

The RRC setup complete message carries a Registration Request message.

In 603, the terminal device may also report indication information for indicating whether the network device is supported to allocate the capability identifier, wherein the indication information may be encapsulated in a NAS message such as a registration request message or a registration update message, and the indication information may also be encapsulated in the RRC setup complete message.

In 604, the access network device sends an N2 message to a core network device.

The N2 message is, for example, an INITIAL UE MESSAGE.

The access network device establishes an N2 connection for the terminal device, carries the registration request message received in 403 in the N2 message, and sends the N2 message to the core network device. If the indication information for indicating whether the network device is supported to allocate the capability identifier is carried in the RRC setup complete message, the access network device further carries the indication information in the N2 message.

605 may be performed next, or 610 may be performed later.

After the core network device receives the registration request message from the terminal device, if at this time the core network device does not obtain the filter information of the terminal device's capability, act 605 or act 610 is executed.

In 605, the core network device acquires a capability identifier and filter information from a UCMF entity.

Specifically, the core network device may send a request message to the UCMF entity for requesting the capability identifier and the filter information, wherein the request message carries a UE ID of the terminal device. The UCMF sends the filter information and the capability identifier to the core network device according to the request message, which carries the UE ID.

If 605 is executed, the UCMF allocates a capability identifier to the terminal device, and sends the capability identifier and the filter information to the core network device.

Next, a registration process, i.e., acts 606 to 609, are executed.

In 606, the core network device sends an N2 message to the access network device.

The N2 message carries a Registration accept message.

Optionally, the N2 message further carries the capability identifier.

In 607, the core network device sends an RRC message to the terminal device.

The RRC message carries a Registration accept message.

In 608, in response to the registration accept message, the terminal device sends an RRC message to the access network device.

The RRC message carries the registration accept complete message.

In 609, the access network device sends an N2 message to the core network device.

The N2 message carries the registration accept complete message.

In 610, the core network device acquires the filter information from the UCMF.

Specifically, the core network device may send to the UCMF entity a request message for requesting the filter information, which carries the UE ID. The UCMF sends the filter information to the core network device according to the request message, which carries the UE ID.

If 605 is not executed before, 610 may be performed here, that is, the core network device allocates the capability identifier to the terminal device, and the core network device acquires the filter information from the UCMF.

Then, the terminal device requests an establishment of a Protocol Data Unit (PDU) Session (PDU session).

In 611, the terminal device sends an RRC message to the access network device.

The RRC message carries a PDU Session establishment request.

In 612, the access network device sends an N2 message to the core network device.

The N2 message carries the PDU session establishment request message.

At 613, the core network device sends an INITIAL CONTEXT SETUP REQUEST message to the access network device.

The initial context setup request message carries the filter information and/or the capability identifier, for example, carrying a list of the filter information and/or the capability identifier.

In 614, an AS security process is started.

After the AS security process, a process of the acquiring capability information, i.e., acts 615 to 617, are executed.

In 615, the access network device performs Enforce filter according to the filter message.

The access network device may determine the capability information that the terminal device needs to report according to the filter information.

As two implementations modes of this implementation, the access network device may send the capability identifier to the terminal device in act 616 or act 619.

In 616, the access network device sends a UE Capability Information request message to the terminal device.

In an implementation mode, the UE Capability Information request message carries the capability identifier.

In 617, in response to the UE Capability Information request message, the terminal device sends UE Capability Information of the terminal device to the access network device.

Optionally, the terminal device may send the capability identifier to the access network device in 617.

After obtaining the capability identifier, the terminal device may associate the capability identifier with the capability information reported by the terminal device in 617, and store an association relation between the capability identifier and the capability information.

In 618, the access network device sends a UE RADIO CAPABILITY INFO INDICATION message to the core network device.

The UE RADIO CAPABILITY INFO INDICATION message is used to indicate the capability information reported by the terminal device.

Optionally, the access network device may send the capability identifier to the core network device in 618.

Next, an RRC reconfiguration process, i.e., act 619 and act 620, are executed.

In 619, the access network device sends an RRC Reconfiguration message to the terminal device.

In another implementation mode, the RRC reconfiguration message carries the capability identifier.

Optionally, the RRC reconfiguration message further carries a PDU Session establishment message.

After obtaining the capability identifier, the terminal device may associate the capability identifier with the capability information reported by the terminal device in 617, and store an association relation between the capability identifier and the capability information.

In 620, in response to the RRC reconfiguration message, the terminal device sends an RRC Reconfiguration Complete message to the access network device.

In 621, the access network device sends an INITIAL CONTEXT SETUP RESPONSE message to the core network device.

In 622, the core network device stores the capability information and the capability identifier.

The core network device associates the capability information with the capability identifier, and stores the association relation.

In 623, the core network device sends the capability information to the UCMF entity, which carries the UE ID.

Optionally, the core network device also sends the capability identifier to the UCMF entity.

In 624, the UCMF entity stores the capability information and the capability identifier.

The UCMF entity is configured to manage the capability information and the capability identification.

In FIG. 6, the capability identifier is carried in act 616 or act 619, for example, a capability information request message carrying the capability identifier is sent to the terminal device in act 616, or an RRC reconfiguration message carrying the capability identifier is sent to the terminal device in act 619. Thereby the terminal device is enabled to acquire the capability identifier from the RRC message.

As shown in FIG. 7, the network device allocates the capability identifier to the terminal device in the RRC process, in which no DRB bearer is established. The method of the implementation of the present application may include some or all of the acts in FIG. 7:

In 701, a terminal device sends an RRC Setup Request message to an access network device.

In 702, the access network device sends an RRC Setup message to the terminal device.

In 703, the terminal device sends an RRC Setup Complete message to the access network device.

The RRC setup complete message carries a Registration Request message.

In 703, the terminal device may further report indication information for indicating whether the network device is supported to allocate the capability identifier, wherein the indication information may be encapsulated in a NAS message such as a registration request message or a registration update message, and the indication information may alternatively be encapsulated in the RRC setup complete message.

In 704, the access network device sends an N2 message to a core network device.

The N2 message is, for example, an INITIAL UE MESSAGE.

The access network device establishes an N2 connection for the terminal device, carries the registration request message received in 403 in the N2 message, and sends the N2 message to the core network device. If the indication information for indicating whether the network device is supported to allocate the capability identifier is carried in the RRC setup complete message, the access network device further carries the indication information in the N2 message.

Then 705 or 706 is then executed.

After the core network device receives the registration request message from the terminal device, if at this time the core network device does not obtain the filter information of the terminal device's capability, act 705 or act 706 is executed.

In 705, the core network device acquires a capability identifier and filter information from a UCMF entity.

Specifically, the core network device may send a request message to the UCMF entity for requesting the capability identifier and the filter information, wherein the request message carries a UE ID of the terminal device. The UCMF sends the filter information and the capability identifier to the core network device according to the request message, which carries the UE ID.

In 706, the core network device acquires the filter information from the UCMF entity.

Specifically, the core network device may send to the UCMF entity a request message for requesting the filter information, which carries the UE ID. The UCMF entity sends the filter information to the core network device according to the request message, which carries the UE ID.

If 705 is executed, the UCMF entity allocates a capability identifier to the terminal device, and sends the capability identifier and the filter information to the core network device.

If 706 is executed, the core network device allocates a capability identifier to the terminal device, and the core network device acquires the filter information from the UCMF entity.

In 707, the core network device sends an N2 message to the access network device.

The N2 message carries the filter information and/or the capability identifier, for example, carrying a list of the filter information and/or the capability identifier.

Optionally, the N2 message further carries a registration accept message.

In 708, the access network device performs Enforce filter according to the filter message.

The access network device may determine the capability information that the terminal device needs to report according to the filter information.

As two implementation modes of this implementation, the access network device may send the capability identifier to the terminal device in act 709 or act 712.

In 709, the access network device sends a UE Capability Enquiry message to the terminal device.

In an implementation mode, the capability enquiry message carries the capability identifier.

In 710, in response to the UE capability enquiry message, the terminal device sends UE Capability Information of the terminal device to the access network device.

Optionally, the terminal device may send the capability identifier to the access network device in 710.

After obtaining the capability identifier, the terminal device may associate the capability identifier with the capability information reported by the terminal device in 710, and store an association relation between the capability identifier and the capability information.

In 711, the access network device sends a UE RADIO CAPABILITY INFO INDICATION message to the core network device.

The UE capability information indication message is used to indicate the capability information reported by the terminal device.

Optionally, the access network device may alternatively send the capability identifier to the core network device in 711.

In 712, the access network device sends an RRC message to the terminal device.

In another implementation mode, the RRC message carries the capability identifier.

Optionally, the RRC message further carries a registration accept message.

After obtaining the capability identifier, the terminal device associates the capability identifier with the capability information reported by the terminal device in 710, and store an association relation between the capability identifier and the capability information.

It should be noted that the RRC message in act 712 and the RRC message in act 412 of FIG. 4 are both used to transmit capability identifiers, but these two RRC messages are completely different.

The RRC message in act 412 of FIG. 4 carries a registration accept message, wherein the registration accept message is a NAS message. The registration accept message is generated by the core network device, and the capability identifier is encapsulated in the registration accept message by the core network device. The RRC message in act 712 of FIG. 7 carries the registration accept message and the capability identifier, both of which are encapsulated in the RRC message by the access network device, and the RRC message is generated by the access network.

It can be understood that the contents (including the capability identifier in the registration accept message) in the registration accept message in the RRC message in act 412 of FIG. 4 are invisible to the access network device. After receiving the registration accept message, the access network device encapsulates the registration accept message in the RRC message and forwards it to the terminal device. However, the capability identifier in the RRC message in act 712 of FIG. 7 is visible to the access network device. After receiving the capability identifier from the core network device, the access network device encapsulates the capability identifier in the RRC message and sends it to the terminal device.

In 713, the terminal device sends an RRC message to the access network device.

The RRC message carries a Registration accept complete message.

Optionally, the RRC message further carries the capability identifier.

In 714, the access network device sends an N2 message to the core network device.

The N2 message carries the registration accept complete message.

In 715, the core network device stores the capability information and the capability identifier.

The core network device associates the capability information with the capability identifier, and stores the association relation.

In 716, the core network device sends the capability information to the UCMF entity, which carries the UE ID.

Optionally, the core network device also sends the capability identifier to the UCMF entity.

In 717, the UCMF entity stores the capability information and the capability identifier.

The UCMF entity is configured to manage the capability information and the capability identification.

In FIG. 7, the capability identifier is carried in act 709 or act 712, for example, a capability enquiry message carrying the capability identifier is sent to the terminal device in act 709, or an RRC message carrying the capability identifier is sent to the terminal device in act 712. Thereby the terminal device is enabled to acquire the capability identifier from the RRC message.

In an implementation of the present application, besides encapsulating the capability identifier in an existing NAS message such as a registration accept message or a UCU message, or in an existing RRC message such as an RRC reconfiguration message or a UE capability enquiry message, the capability identifier may further be carried in a new message, wherein the new message is used to transmit the capability identifier.

As shown in FIG. 8, it is assumed that the capability identifier is allocated by the UCMF entity to the terminal device. The method of the implementation of the present application may include some or all of the acts in FIG. 8:

In 801, a core network device acquires filter information from a UCMF entity.

Specifically, the core network device may send a request message to the UCMF entity for requesting the filter information, wherein the request message carries a UE ID of the terminal device. The UCMF sends the capability identifier to the core network device according to the request message, which carries the UE ID.

In 802, the access network device sends an N2 message to a core network device.

The N2 message carries the filter information.

In 803, AS security process is provided.

In 804, the access network device performs Enforce filter according to the filter message.

The access network device may determine the capability information that the terminal device needs to report according to the filter information.

In 805, the access network device sends a UE Capability Enquiry message to the terminal device.

In 806, in response to the UE capability enquiry message, the terminal device sends UE Capability Information of the terminal device to the access network device.

After obtaining the capability identifier, the terminal device may associate the capability identifier with the capability information reported by the terminal device in 806, and store an association relation between the capability identifier and the capability information.

Optionally, the terminal device may send the capability identifier to the access network device in 806.

In 807, the access network device sends a UE RADIO CAPABILITY INFO INDICATION message to the core network device.

The UE RADIO CAPABILITY INFO INDICATION message is used to indicate the capability information reported by the terminal device.

Optionally, the access network device may send the capability identifier to the core network device in 711.

In 808, the core network device sends the capability information to the UCMF entity.

In 809, the core network device acquires the capability identifier from the UCMF entity.

Specifically, after sending the capability information to the UCMF entity, the core network device sends to the UCMF entity a request message for requesting the capability identifier, so that the UCMF entity sends to the core network device the capability identifier allocated to the terminal device.

In 810, the core network device sends an N2 message to the access network device.

The N2 message carries the capability identifier.

The N2 message may be a new N2 message, wherein the new N2 message is used to transmit the capability identifier.

In 811, the access network device sends an RRC message to the terminal device.

The RRC message carries the capability identifier.

The RRC message may be a new RRC message, wherein the new RRC message is used to transmit the capability identifier.

The RRC message may alternatively be another RRC message such as an RRC reconfiguration message.

In FIG. 8, by act 810 and act 811, the core network device sends the capability identifier to the terminal device, so that the terminal device can obtain the capability identifier.

In various implementations of the present application, sequence numbers of the various processes do not imply an order of execution of the various processes, the order of execution of the various processes should be determined by their functions and internal logics, and should not constitute any limitation on implementation processes of implementations of the present application.

For example, in FIG. 8, act 808 may be performed before act 809, that is, after the UCMF entity obtains the capability information, it sends the capability identifier to the core network device. Act 808 may alternatively be executed after act 809. For example, the UCMF entity first sends the capability identifier to the core network device based on the request from the core network device, and the core network device transmits the capability identifier to the terminal device and receives a response from the terminal device, and then sends the capability information to the UCMF entity.

For another example, in FIG. 8, act 801 may be executed before act 809, that is, the core network first acquires the filter information so as to obtain the capability information of the terminal device, and then requests the UCMF entity for the capability identifier. Act 801 may alternatively be executed after act 809, that is, the core network device first acquires the capability identifier, then acquires the filter information so as to obtain the capability information of the terminal device, and sends the capability information to the UCMF entity.

For another example, the order of reporting the capability information and receiving the capability identifier by the terminal device is not limited in the implementations of the present application; the order of sending the capability enquiry message and sending the capability identifier to the terminal device by the access network device is not limited; the order of the core network device receiving the capability information sent by the access network device and the core network device sending the capability identification is not limited; the order of the UCMF entity receiving the capability information sent by the core network device and the UCMF entity sending the capability identification is not limited.

It should be noted that, various implementations described in the present application and/or the technical features in various implementations may be arbitrarily combined with each other if there is no conflict, and the technical solutions obtained after combination should also fall into the protection scope of the present application.

A communication method according to implementations of the present application has been described in detail above. An apparatus according to implementations of the present application will be described below with reference to FIGS. 9 to 15 and technical features described in the method implementations are applicable to following apparatus implementations.

Figure 9:
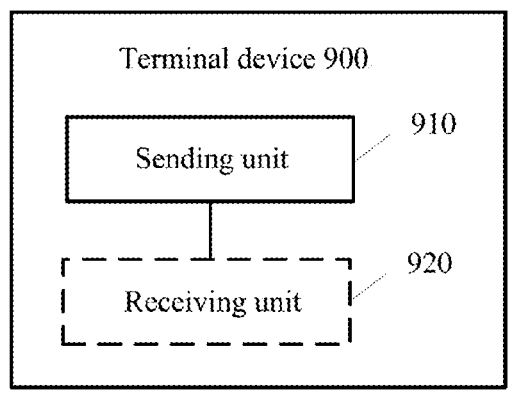
FIG. 9 is a schematic block diagram of a terminal device according to an implementation of the present application.

FIG. 9 is a schematic block diagram of a terminal device 900 according to an implementation of the present application. As shown in FIG. 9, the terminal device 900 includes a receiving unit 910. The receiving unit 910 is configured to:

receive, in a non-access stratum (NAS) process, a capability identifier allocated by a network device to the terminal device; or, receive, in a radio resource control (RRC) process, the capability identifier;

wherein the capability identifier is used to identify capability information of the terminal device.

In this implementation, the terminal device acquires the capability identifier allocated to it by the network device in the NAS process or an RRC process, and identifies its capability information by the capability identifier, thus reducing the signaling overhead caused by reporting and storage of the capability information.

For example, a core network device may send to an access network device a NAS message in which the capability identifier is encapsulated, and the access network device sends the NAS message to the terminal device. For another example, the core network device sends the capability identifier to the access network device, the access network device encapsulates the capability identifier in an RRC message and sends the RRC message to the terminal device. The terminal device acquires the capability identifier from the NAS message or the RRC message.

Optionally, the NAS process includes a registration process.

Optionally, the terminal device further includes a sending unit 920, wherein the sending unit 920 is configured to send a registration request message; the receiving unit 910 is specifically configured to receive a registration accept message, wherein the registration accept message carries the capability identifier.

Optionally, the sending unit 920 is further configured to send a registration accept complete message by the terminal device in response to the registration accept message.

Optionally, the registration accept complete message carries the capability identifier.

Optionally, the NAS process includes a configuration update process.

Optionally, the receiving unit 910 is specifically configured to receive a configuration update command, wherein the configuration update command carries the capability identifier.

Optionally, the sending unit 920 is configured to send a configuration update complete message in response to the configuration update command.

Optionally, the configuration update complete message carries the capability identifier.

Optionally, the RRC process includes an RRC reconfiguration process.

Optionally, the receiving unit 910 is specifically configured to receive an RRC reconfiguration message, wherein the RRC reconfiguration message carries the capability identifier.

Optionally, the sending unit 920 is configured to send an RRC reconfiguration complete message in response to the RRC reconfiguration message.

Optionally, the RRC reconfiguration complete message carries the capability identifier.

Optionally, the RRC process includes a capability information acquisition process.

Optionally, the receiving unit 910 is specifically configured to receive a capability enquiry message, wherein the capability enquiry message carries the capability identifier.

Optionally, the sending unit 920 is configured to send capability information of the terminal device in response to the capability enquiry message.

Optionally, the sending unit 920 is further configured to send the capability identifier.

Optionally, the RRC process includes a downlink message transmission process.

Optionally, the receiving unit 910 is specifically configured to receive a downlink message, wherein the downlink message carries the capability identifier.

Optionally, the downlink message further carries a registration accept message.

Optionally, the receiving unit 910 is further configured to receive a capability enquiry message; the sending unit 920 is further configured to send the capability information of the terminal device in response to the capability enquiry message.

Optionally, the terminal device further includes a processing unit and a storage unit, wherein the processing unit is configured to associate the capability information with the capability identifier; and the storage unit is configured to store the associated capability information and capability identifier.

Optionally, the capability identifier is allocated to the terminal device by a core network device or a user capability management function (UCMF) entity.

It should be understood that the terminal device 900 may perform the corresponding operations performed by the terminal device in any method implementation of the implementations of the present application, which will not be repeated here for brevity.

Figure 10:
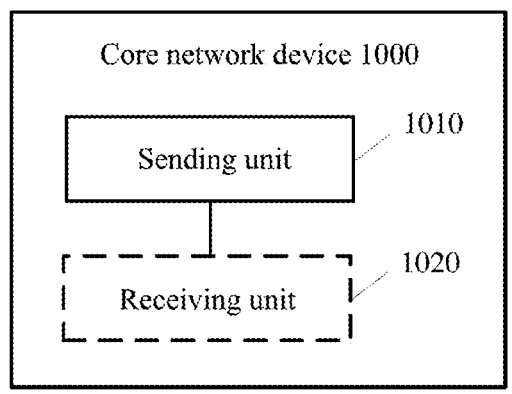
FIG. 10 is a schematic block diagram of an access network device according to an implementation of the present application.

FIG. 10 is a schematic block diagram of a core network device 1000 according to an implementation of the present application. As shown in FIG. 10, the core network device 1000 includes a sending unit 1010. The sending unit 1010 is configured to:

send, in a non-access stratum (NAS) process, a capability identifier allocated to a terminal device, wherein the capability identifier is used to identify capability information of the terminal device.

In this implementation, the core network device sends to the terminal device the capability identifier allocated to the terminal device in the NAS process, and identifies the capability information of the terminal device through the capability identifier, thus reducing the signaling overhead caused by reporting and storage of the capability information.

For example, a core network device may send to an access network device a NAS message in which the capability identifier is encapsulated, and the access network device sends the NAS message to the terminal device.

Optionally, the NAS process includes a registration process.

Optionally, the core network device further includes a receiving unit 1020, wherein the receiving unit 1020 is configured to receive a registration request message sent by the access network device from the terminal device; the sending unit 1010 is specifically configured to send a registration accept message to the terminal device through the access network device in response to the registration request message, wherein the registration accept message carries the capability identifier.

Optionally, the receiving unit 1020 is further configured to receive a registration accept complete message sent by the access network device from the terminal device.

Optionally, the registration accept complete message carries the capability identifier.

Optionally, the NAS process includes a configuration update process.

Optionally, the sending unit 1010 is specifically configured to send a configuration update command to the terminal device through the access network device, wherein the configuration update command carries the capability identifier.

Optionally, the receiving unit 1020 is further configured to receive a configuration update complete message sent by the access network device from the terminal device.

Optionally, the configuration update complete message carries the capability identifier.

Optionally, the sending unit 1010 is further configured to send the capability identifier to the access network device.

Optionally, the sending unit 1010 is further configured to send a capability identifier enquiry message to a user capability management function (UCMF) entity, wherein the capability identifier enquiry message is used to instruct the UCMF entity to allocate the capability identifier to the terminal device; the receiving unit 1020 is further configured to receive the capability identifier sent by the UCMF entity.

Optionally, the core network device further includes a processing unit, wherein the processing unit is configured to allocate the capability identifier to the terminal device.

Optionally, the receiving unit 1020 is further configured to receive the capability information of the terminal device sent by the access network device.

Optionally, among the processing unit and the storage unit, the processing unit is configured to associate the capability information with the capability identifier; and the storage unit is configured to store the associated capability information and capability identifier.

Optionally, the sending unit 1010 is further configured to send the capability information and the capability identifier to the UCMF entity.

Optionally, the receiving unit 1020 is further configured to receive filter information sent by the UCMF entity, wherein the filter information is used to determine a capability of the terminal device that needs to be reported; the sending unit 1010 is further configured to send the filter information to the access network device.

It should be understood that the core network device 1000 may perform the corresponding operations performed by the core network device in any method implementation of the implementations of the present application, which will not be repeated here for brevity.

Figure 11:
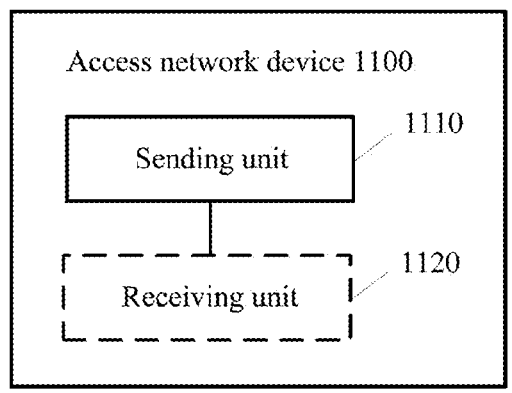
FIG. 11 is a schematic block diagram of a core network device according to an implementation of the present application.

FIG. 11 is a schematic block diagram of an access network device 1100 according to an implementation of the present application. As shown in FIG. 11, the access network device 1100 includes a sending unit 1100. The sending unit 1110 is configured to:

send, in a non-access stratum (NAS) process, a capability identifier allocated to a terminal device; or, send the capability identifier in a radio resource control (RRC) process;

wherein the capability identifier is used to identify capability information of the terminal device.

In this implementation, the access network device acquires the capability identifier allocated by the network device to the terminal device in the NAS process or the RRC process, and sends the capability identifier to the terminal device, and identifies the capability information of the terminal device through the capability identifier, thus reducing the signaling overhead caused by reporting and storage of the capability information.

For example, a core network device may send to the access network device a NAS message in which the capability identifier is encapsulated, and the access network device transmits transparently the NAS message to the terminal device. For another example, the core network device sends the capability identifier to the access network device, the access network device encapsulates the capability identifier in an RRC message and sends the RRC message to the terminal device. The terminal device acquires the capability identifier from the NAS message or the RRC message.

Optionally, the NAS process includes a registration process.

Optionally, the terminal device further includes a receiving unit 1120, wherein the receiving unit 1120 is configured to receive a registration request message sent by the terminal device; the sending unit 1110 is configured to send the registration request message to the core network device; the receiving unit 1120 is further configured to receive a registration accept message sent by the core network device; the sending unit 1110 is specifically configured to send the registration accept message to the terminal device, wherein the registration accept message carries the capability identifier.

Optionally, the receiving unit 1120 is further configured to receive a registration accept complete message sent by the terminal device; the sending unit 1110 is further configured to send the registration accept complete message to the core network device.

Optionally, the registration accept complete message carries the capability identifier.

Optionally, the NAS process includes a configuration update process.

Optionally, the receiving unit 1120 is configured to receive a configuration update command sent by a core network device; the sending unit 1110 is specifically configured to send the configuration update command to the terminal device, wherein the configuration update command carries the capability identifier.

Optionally, the receiving unit 1120 is further configured to receive a configuration update complete message sent by the terminal device; the sending unit 1110 is further configured to send the configuration update complete message to the core network device.

Optionally, the configuration update complete message carries the capability identifier.

Optionally, the receiving unit 1120 is further configured to receive the capability identifier sent by the core network device.

Optionally, the RRC process includes an RRC reconfiguration process.

Optionally, the receiving unit 1120 is configured to receive the capability identifier sent by the core network device; the sending unit 1110 is specifically configured to send an RRC reconfiguration message to the terminal device, wherein the RRC reconfiguration message carries the capability identifier.

Optionally, the receiving unit 1120 is further configured to receive an RRC reconfiguration complete message sent by the terminal device.

Optionally, the RRC reconfiguration complete message carries the capability identifier.

Optionally, the RRC process includes a downlink message transmission process.

Optionally, the receiving unit 1120 is configured to receive the capability identifier sent by the core network device; the sending unit 1110 is specifically configured to send a downlink message to the terminal device, wherein the downlink message carries the capability identifier.

Optionally, the downlink message further carries a registration accept message.

Optionally, the receiving unit 1120 is further configured to receive the capability identifier sent by the terminal device.

Optionally, the RRC process includes a capability information acquisition process.

Optionally, the receiving unit 1120 is configured to receive the capability identifier sent by the core network device; the sending unit 1110 is configured to send a capability enquiry message to the terminal device, wherein the capability enquiry message carries the capability identifier.

Optionally, the receiving unit 1120 is further configured to receive capability information of the terminal device sent by the terminal device.

Optionally, the receiving unit 1120 is further configured to receive the capability identifier sent by the terminal device.

Optionally, the sending unit 1110 is further configured to send the capability enquiry message to the terminal device; the receiving unit 1120 is further configured to receive capability information of the terminal device sent by the terminal device.

Optionally, the sending unit 1110 is further configured to send the capability information of the terminal device to the core network device.

Optionally, the receiving unit 1120 is further configured to receive filter information sent by core network device, wherein the filter information is used to determine a capability that the terminal device needs to report; the sending unit 1110 is specifically configured to send the capability enquiry message to the terminal device according to the filter information.

Optionally, the capability identifier is allocated to the terminal device by the core network device or the UCMF entity.

It should be understood that the access network device 1100 may perform the corresponding operations performed by the access network device in any method implementation of the implementations of the present application, which will not be repeated here for brevity.

Figure 12:
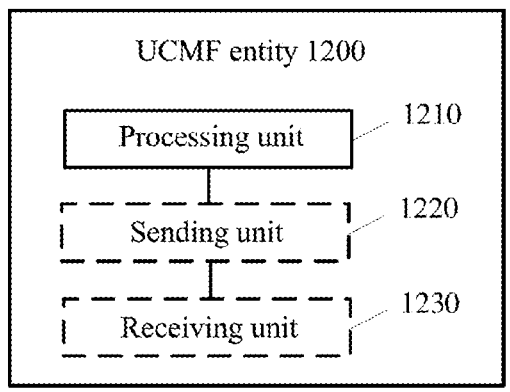
FIG. 12 is a schematic block diagram of a UCMF entity according to an implementation of the present application.

FIG. 12 is a schematic block diagram of a UCMF entity 1200 according to an implementation of the present application. As shown in FIG. 12, the UCMF entity 1200 includes a processing unit 1210. The processing unit 1210 is configured to: allocate a capability identifier to a terminal device, wherein the capability identifier is used to identify capability information of the terminal device, and the capability identifier is sent to the terminal device in a non-access stratum (NAS) process or a radio resource control (RRC) process.

In this implementation, the UCMF entity may allocate the capability identifier to the terminal device. The capability identifier is transmitted to the terminal device in the NAS process or the RRC process, and the capability information of the terminal device is identified by the capability identifier, thereby reducing the signaling overhead caused by reporting and storage of the capability information.

In an implementation mode, the UCMF entity may allocate a capability identifier to the terminal device, and send the capability identifier and filter information to the core network device.

In another implementation mode, the UCMF entity sends the filter information to the core network device, and the core network device allocates the capability identifier to the terminal device.

Thereafter, for example, the core network device may encapsulate the capability identifier in a NAS message, and send to the access network device the NAS message in which the capability identifier is encapsulated, and the access network device sends the NAS message to the terminal device. For another example, the core network device may send the capability identifier to the access network device, the access network device encapsulates the capability identifier in an RRC message and sends the RRC message to the terminal device. The terminal device acquires the capability identifier from the NAS message or the RRC message.

Optionally, the NAS process includes a registration process or a configuration update process.

Optionally, the RRC process includes an RRC reconfiguration process, a capability information acquisition process or a downlink message transmission process.

Optionally, the UCMF entity further includes a receiving unit 1220 and a sending unit 1230, wherein the receiving unit 1220 is configured to receive a capability identifier enquiry message sent by a core network device, and the capability identifier enquiry message is used to instruct the UCMF entity to allocate the capability identifier to the terminal device; the sending unit 1230 is configured to send to the core network device the capability identifier allocated by the UCMF entity to the terminal device in response to the capability identifier enquiry message.

Optionally, the sending unit 1230 is further configured to send the filter information to the core network device, wherein the filter information is used to determine a capability that the terminal device needs to report.

Optionally, the receiving unit 1220 is further configured to receive the capability information and/or the capability identifier of the terminal device sent by the core network device.

Optionally, the UCMF entity further includes a storage unit, wherein the storage unit is configured to store the capability information and the capability identifier; the processing unit 1210 is configured to manage the capability information and the capability identifier.

It should be understood that the UCMF entity 1600 may perform the corresponding operations performed by the UCMF entity in any method implementation of the implementations of the present application, which will not be repeated here for brevity.

Figure 13:
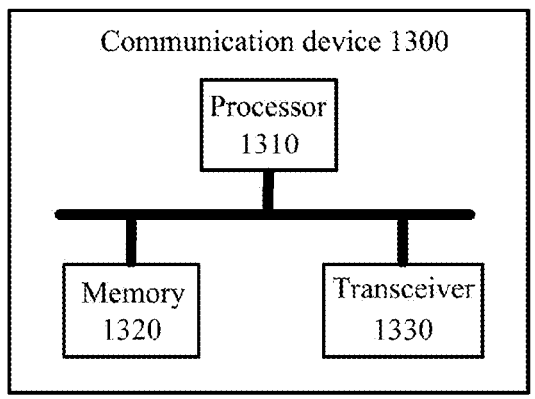
FIG. 13 is a schematic diagram of a structure of a communication device according to an implementation of the present application.

FIG. 13 is a schematic diagram of a structure of a communication device 1300 according to an implementation of the present application. The communication device 1300 shown in FIG. 13 includes a processor 1310, wherein the processor 1310 may call and run a computer program from a memory to implement a method in an implementation of the present application.

Optionally, as shown in FIG. 13, the communication device 1300 may further include a memory 1320. The processor 1310 may call and run a computer program from the memory 1320 to implement the method in the implementation of the present application.

The memory 1320 may be a separate device independent of the processor 1310 or may be integrated in the processor 1310.

Optionally, as shown in FIG. 13, the communication device 1300 may further include a transceiver 1330, and the processor 1310 may control the transceiver 1330 to communicate with another device. Specifically, the transceiver may send information or data to another device or receive information or data sent by another device.

The transceiver 1330 may include a transmitter and a receiver. The transceiver 1330 may further include antennas, and the number of antennas may be one or more.

Optionally, the communication device 1300 may be specifically a terminal device according to an implementation of the present application, and the communication device 1300 may implement the corresponding processes implemented by the terminal device in various methods in the implementations of the present application, which will not be repeated here for brevity.

Optionally, the communication device 1300 may be specifically a core network device according to an implementation of the present application, and the communication device 1300 may implement the corresponding processes implemented by the core network device in various methods in the implementations of the present application, which will not be repeated here for brevity.

Optionally, the communication device 1300 may be specifically an access network device according to an implementation of the present application, and the communication device 1300 may implement the corresponding processes implemented by the access network device in various methods in the implementations of the present application, which will not be repeated here for brevity.

Optionally, the communication device 1300 may be specifically a UCMF entity according to an implementation of the present application, and the communication device 1300 may implement the corresponding processes implemented by the UCMF entity in various methods in the implementations of the present application, which will not be repeated here for brevity.

Figure 14:
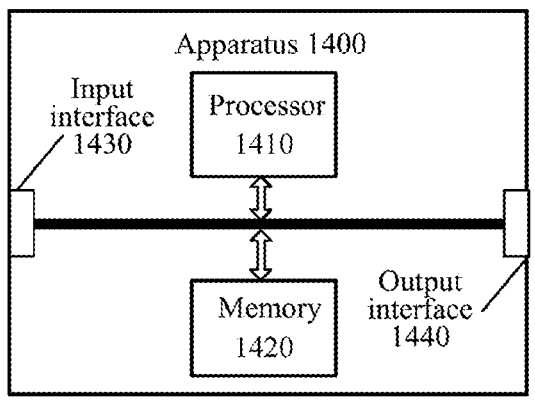
FIG. 14 is a schematic diagram of a structure of an apparatus according to an implementation of the present application.

FIG. 14 is a schematic diagram of a structure of an apparatus for allocating a capability identifier according to an implementation of the present application. The apparatus 1400 shown in FIG. 14 includes a processor 1410. The processor 1410 may call and run a computer program from a memory to implement a method in an implementation of the present application.

Optionally, as shown in FIG. 14, the apparatus 1400 may further include a memory 1420. The processor 1410 may call and run a computer program from the memory 1420 to implement the method in the implementation of the present application.

The memory 1420 may be a separate device independent of the processor 1410 or may be integrated in the processor 1410.

Optionally, the apparatus 1400 may further include an input interface 1430. The processor 1410 may control the input interface 1430 to communicate with another device or chip. Specifically, the processor 1410 may acquire information or data sent by another device or chip.

Optionally, the apparatus 1400 may further include an output interface 1440. The processor 1410 may control the output interface 1440 to communicate with another device or chip. Specifically, the processor 710 may output information or data to another device or chip.

Optionally, the apparatus may be applied to a terminal device in an implementation of the present application, and the apparatus may implement corresponding processes implemented by the terminal device in various methods of the implementations of the present application, which will not be repeated here for brevity.

Optionally, the apparatus may be applied to a core network device in an implementation of the present application, and the apparatus may implement corresponding processes implemented by the core network device in various methods of the implementations of the present application, which will not be repeated here for brevity.

Optionally, the apparatus may be applied to an access network device in an implementation of the present application, and the apparatus may implement corresponding processes implemented by the access network device in various methods of the implementations of the present application, which will not be repeated here for brevity.

Optionally, the apparatus may be applied to a UCMF entity in an implementation of the present application, and the apparatus may implement corresponding processes implemented by the UCMF entity in various methods of the implementations of the present application, which will not be repeated here for brevity.

Optionally, the apparatus is a chip.

The chip in the implementations of the present application may be referred to as a system-level chip, a system chip, a chip system or a system-on-chip, etc.

The processor in the implementations of the present application may be an integrated circuit chip having a signal processing capability. In an implementation process, the acts of the foregoing method implementations may be implemented by using an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or other programmable logic devices, discrete gates or transistor logic devices, or discrete hardware components. The processor may implement or perform methods, acts and logical block diagrams disclosed in the implementations of the present application. The general purpose processor may be a microprocessor, or the processor may be any conventional processor or the like. The acts of the method disclosed with reference to this implementation of the present application may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

The memory in implementations of the present application may be a transitory memory or non-transitory memory, or may include both transitory and non-transitory memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM).

Herein, the above memory is an example for illustration but should not be construed as a limitation. For example, the memory in an implementation of the present application may alternatively be a static RAM (SRAM), a dynamic RAM (DRAM), a Synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, memories in the implementations of the present application are intended to include, but are not limited to, these and any other suitable types of memories.

Figure 15:
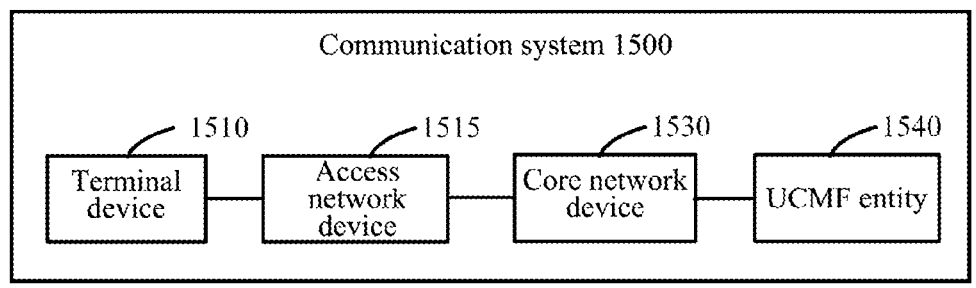
FIG. 15 is a schematic block diagram of a communication system according to an implementation of the present application.

FIG. 15 is a schematic diagram of a communication system according to an implementation of the present application. As shown in FIG. 15, the communication system 1500 includes a terminal device 1510 and at least one of the following network devices: an access network device 1520, a core network device 1530 and a UCMF entity 1540.

Among them, the terminal device 1510 is configured to acquire, in an NAS process, a capability identifier allocated by the network device to the terminal device; or acquire the capability identifier in an RRC process.

The access network device 1520 is configured to send, in the NAS process, the capability identifier allocated to the terminal device; or send, in the RRC process, the capability identifier allocated to the terminal device.

The core network device 1530 is configured to send, in the NAS process, the capability identifier allocated to the terminal device; or send, in the RRC process, the capability identifier allocated to the terminal device.

The UCMF entity 1540 is configured to allocate the capability identifier to the terminal device, wherein the capability identifier is sent to the terminal device in the non-access stratum (NAS) process or the radio resource control (RRC) process.

wherein the capability identifier is used to identify capability information of the terminal device.

The terminal device 1510 may be configured to implement corresponding functions implemented by the terminal device in a method according to an implementation of the present application, and composition of the terminal device 1510 may be as shown in the terminal device 900 in FIG. 9, which will not be repeated here for brevity.

The core network device 1530 may be configured to implement corresponding functions implemented by the core network device in a method according to an implementation of the present application, and composition of the core network device 1530 may be as shown in the core network device 1000 in FIG. 10, which will not be repeated here for brevity.

The access network device 1520 may be configured to implement corresponding functions implemented by the access network device in a method according to an implementation of the present application, and composition of the access network device 1520 may be as shown in the access network device 1100 in FIG. 11, which will not be repeated here for brevity.

The UCMF entity 1540 may be configured to implement corresponding functions implemented by the UCMF entity in a method according to an implementation of the present application, and composition of the UCMF entity 1540 may be as shown in the UCMF entity 1200 in FIG. 12, which will not be repeated here for brevity.

An implementation of the present application further provides a computer readable storage medium configured to store a computer program. Optionally, the computer readable storage medium may be applied to a network device in an implementation of the present application, and the computer program enables the computer to perform the corresponding processes implemented by the network device in various methods of the implementations of the present application, which will not be repeated here for brevity. Optionally, the computer readable storage medium may be applied to a terminal device in an implementation of the present application, and the computer program enables the computer to perform the corresponding processes implemented by the terminal device in various methods of the implementations of the present application, which will not be repeated here for brevity. Optionally, the computer-readable storage medium may be applied to a network device such as an access network device, a core network device or a UCMF entity in an implementation of the present application, and the computer program enables the computer to execute the corresponding processes implemented by the network device in various methods of the implementations of the present application, which will not be repeated here for brevity.

An implementation of the present application further provides a computer program product including computer program instructions. Optionally, the computer program product may be applied to a network device in an implementation of the present application, and the computer program instructions enable a computer to perform the corresponding processes implemented by the network device in various methods of the implementations of the present application, which will not be repeated here for brevity. Optionally, the computer program product may be applied to a terminal device in an implementation of the present application, and the computer program instructions enable a computer to perform the corresponding processes implemented by the terminal device in various methods of the implementations of the present application, which will not be repeated here for brevity. Optionally, the computer-readable storage medium may be applied to a network device such as an access network device, a core network device or a UCMF entity in an implementation of the present application, and the computer program enables the computer to execute the corresponding processes implemented by the network device in various methods of the implementations of the present application, which will not be repeated here for brevity.

An implementation of the present application further provides a computer program. Optionally, the computer program may be applied to a network device in an implementation of the present application. When the computer program is run on a computer, the computer is enabled to perform the corresponding processes implemented by the network device in various methods of the implementations of the present application, which will not be repeated here for brevity. Optionally, the computer program may be applied to a terminal device in an implementation of the present application. When the computer program is run on a computer, the computer is enabled to perform the corresponding processes implemented by the terminal device in various methods of the implementations of the present application, which will not be repeated here for brevity. Optionally, the computer-readable storage medium may be applied to a network device such as an access network device, a core network device or a UCMF entity in an implementation of the present application, and the computer program enables the computer to execute the corresponding processes implemented by the network device in various methods of the implementations of the present application, which will not be repeated here for brevity.

The terms "system" and "network" in the implementations of the present disclosure are often used interchangeably herein. The term "and/or" in this document is merely an association relation describing associated objects, indicating that there may be three relations, for example, A and/or B may indicate three cases: A alone, A and B, and B alone. In addition, the symbol "/" in this document generally indicates that objects before and after the symbol "I" have an "or" relation.

In the implementations of the present disclosure, "B corresponding to A" means that B is associated with A, and B may be determined according to A. However, it should be further understood that determining B according to A does not mean B is determined according to A only, but B may be determined according to A and/or other information.

Those of ordinary skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present application.

Those skilled in the art may clearly understand that for convenience and conciseness of description, the specific working processes of the systems, apparatuses and units described above may refer to the corresponding processes in the method implementations and will not be described here.

In several implementations provided by the present application, it should be understood that the disclosed systems, apparatuses and methods may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

Various functional units in various implementations of the present application may be integrated in one processing unit, or the various units may be physically present separately, or two or more units may be integrated in one unit.

The functions may be stored in a computer readable storage medium if implemented in a form of software functional units and sold or used as a separate product. Based on such understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present application. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

What is claimed is:

1. A method for allocating a capability identifier, comprising:
   acquiring, by a terminal device, a capability identifier allocated by a network device to the terminal device in a non-access stratum (NAS) process; or
   acquiring, by the terminal device, the capability identifier in a radio resource control (RRC) process;
   wherein the capability identifier is used to identify capability information of the terminal device, and the capability information comprises at least one of system capability information, band capability information, band combination capability information and terminal type capability information.

2. The method of claim 1, wherein the NAS process comprises a registration process.

3. The method of claim 2, wherein acquiring, by the terminal device, the capability identifier allocated by the network device to the terminal device in the NAS process comprises:
   sending, by the terminal device, a registration request message; and
   receiving, by the terminal device, a registration accept message, wherein the registration accept message carries the capability identifier.

4. The method of claim 1, wherein the NAS process comprises a configuration update process.

5. The method of claim 4, wherein acquiring, by the terminal device, the capability identifier allocated by the network device to the terminal device in the NAS process comprises:
   receiving, by the terminal device, a configuration update command, wherein the configuration update command carries the capability identifier.

6. The method of claim 1, further comprising:
   receiving, by the terminal device, a capability enquiry message; and
   sending, by the terminal device, the capability information of the terminal device in response to the capability enquiry message.

7. The method of claim 6, further comprising:
   associating, by the terminal device, the capability information with the capability identifier; and storing the associated capability information and the capability identifier.

8. The method of claim 1, wherein the capability identifier is allocated to the terminal device by a core network device or a user capability management function (UCMF) entity.

9. A method for allocating a capability identifier, comprising:
   sending, by a core network device, a capability identifier allocated to a terminal device in a non-access stratum (NAS) process, wherein the capability identifier is used to identify capability information of the terminal device, and the capability information comprises at least one of system capability information, band capability information, band combination capability information and terminal type capability information.

10. The method of claim 9, wherein the NAS process comprises a registration process.

11. The method of claim 10, wherein sending, by the core network device, the capability identifier allocated to the terminal device in the NAS process comprises:
    receiving, by the core network device, a registration request message which is from the terminal device and sent by an access network device; and
    sending, by the core network device, a registration accept message to the terminal device through the access network device in response to the registration request message, wherein the registration accept message carries the capability identifier.

12. The method of claim 9, wherein the NAS process comprises a configuration update process.

13. The method of claim 12, wherein allocating, by the core network device, the capability identifier to the terminal device in the NAS process comprises:
    sending, by the core network device, a configuration update command to the terminal device through an access network device, wherein the configuration update command carries the capability identifier.

14. The method of claim 9, further comprising:
    sending, by the core network device, a capability identifier enquiry message to a user capability management function (UCMF) entity, wherein the capability identifier enquiry message is used to instruct the UCMF entity to allocate the capability identifier to the terminal device; and receiving, by the core network device, the capability identifier sent by the UCMF entity.

15. The method of claim 9, further comprising:

receiving, by the core network device, capability information of the terminal device sent by the access network device.

16. The method of claim 15, further comprising:

associating, by the core network device, the capability information with the capability identifier; and storing the associated capability information and the capability identifier.

17. The method of claim 15, further comprising:

sending, by the core network device, the capability information and the capability identifier to a UCMF entity.

18. The method of claim 9, further comprising:

receiving, by the core network device, filter information sent by a UCMF entity, wherein the filter information is used to determine a capability that the terminal device needs to report; and sending, by the core network device, the filter information to an access network device.

19. A method for allocating a capability identifier, comprising:

sending, by an access network device, a capability identifier allocated to a terminal device in a non-access stratum (NAS) process; or sending, by the access network device, the capability identifier in a radio resource control (RRC) process;

wherein the capability identifier is used to identify capability information of the terminal device, and the capability information comprises at least one of system capability information, band capability information, band combination capability information and terminal type capability information.

20. The method of claim 19, wherein the NAS process comprises a registration process.

21. The method of claim 20, wherein sending, by the access network device, the capability identifier allocated to the terminal device in the NAS process comprises:

receiving, by the access network device, a registration request message sent by the terminal device and sending the registration request message to a core network device; and receiving, by the access network device, a registration accept message sent by the core network device and sending the registration accept message to the terminal device, wherein the registration accept message carries the capability identifier.

22. The method of claim 19, wherein the NAS process comprises a configuration update process.

23. The method of claim 22, wherein sending, by the access network device, the capability identifier allocated to the terminal device in the NAS process comprises:

receiving, by the access network device, a configuration update command sent by a core network device, and sending the configuration update command to the terminal device, wherein the configuration update command carries the capability identifier.

24. The method of claim 19, wherein the capability identifier is allocated to the terminal device by a core network device or a user capability management function (UCMF) entity.

25. A terminal device, comprising a processor, a transceiver and a memory, wherein the memory is configured to store a computer program, and the processor is configured to call and run the computer program stored in the memory to control the transceiver to perform the method of claim 1.

26. A core network device, comprising a processor, a transceiver and a memory, wherein the memory is configured to store a computer program, and the processor is configured to call and run the computer program stored in the memory to control the transceiver to perform the method of claim 9.

* * * * *